(12) United States Patent
Nishihara et al.

(10) Patent No.: US 10,883,931 B2
(45) Date of Patent: Jan. 5, 2021

(54) OPTICAL MEASURING INSTRUMENT, FLOW CYTOMETER, AND RADIATION COUNTER

(71) Applicant: SONY CORPORATION, Tokyo (JP)

(72) Inventors: Toshiyuki Nishihara, Kanagawa (JP); Kenichi Okumura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 16/076,885

(22) PCT Filed: Feb. 10, 2017

(86) PCT No.: PCT/JP2017/004953
§ 371 (c)(1),
(2) Date: Aug. 9, 2018

(87) PCT Pub. No.: WO2017/145816
PCT Pub. Date: Aug. 31, 2017

(65) Prior Publication Data
US 2019/0049374 A1    Feb. 14, 2019

(30) Foreign Application Priority Data
Feb. 24, 2016  (JP) .................................. 2016-032718

(51) Int. Cl.
*G01N 21/53* (2006.01)
*G01N 15/14* (2006.01)
(Continued)

(52) U.S. Cl.
CPC ......... *G01N 21/53* (2013.01); *G01N 15/1404* (2013.01); *G01N 15/1429* (2013.01);
(Continued)

(58) Field of Classification Search
CPC .................................................... G01N 21/53
(Continued)

(56) References Cited

U.S. PATENT DOCUMENTS

| 5,422,712 A * | 6/1995 | Ogino ................ G01N 15/1434 |
|---|---|---|
| | | 250/458.1 |
| 7,102,675 B1 * | 9/2006 | Tokunaga .............. G03B 13/36 |
| | | 348/297 |

(Continued)

FOREIGN PATENT DOCUMENTS

| JP | 06-043090 A | 2/1994 |
|---|---|---|
| JP | 2006-313151 A | 11/2006 |

(Continued)

OTHER PUBLICATIONS

"Dai 2 Sho Kotai Kenshutsuki, Hakari no Kenshutsuki to sono Mochiikata", 1st edition, Japan Scientific Societies Press, Sep. 1, 1991, pp. 45-87.

(Continued)

*Primary Examiner* — Tarifur R Chowdhury
*Assistant Examiner* — Omar H Nixon
(74) *Attorney, Agent, or Firm* — Chip Law Group

(57) ABSTRACT

Provided are an optical measuring instrument, a flow cytometer, and a radiation counter which reduces a size and a weight of a photodetector, and enables detection of weak pulsed light with a high degree of accuracy and at a high speed. A laser beam source irradiates a specimen to be measured with a laser beam and generates a light pulse of intensity corresponding to the irradiation. An imaging element provided with a pixel including a photoelectric conversion element and an amplification element which sequentially accumulates charges subjected to photoelectric conversion by the photoelectric conversion element for a predetermined period and outputs a voltage as a pixel signal according to an accumulated charge amount after the accumulation is completed through the amplification element, and detects a light amount of the light pulse on the basis of a pixel signals of a pixel group.

15 Claims, 19 Drawing Sheets

(51) Int. Cl.
*G01N 21/64* (2006.01)
*G01N 15/10* (2006.01)

(52) U.S. Cl.
CPC ..... *G01N 15/1434* (2013.01); *G01N 15/1436* (2013.01); *G01N 15/1459* (2013.01); *G01N 21/6402* (2013.01); *G01N 21/6456* (2013.01); *G01N 2015/1006* (2013.01)

(58) Field of Classification Search
USPC ......................................................... 356/246
See application file for complete search history.

(56) References Cited

U.S. PATENT DOCUMENTS

| | | | |
|---|---|---|---|
| 2004/0189845 A1* | 9/2004 | Kasuga | H04N 5/353 348/308 |
| 2006/0250604 A1 | 11/2006 | Hamada et al. | |
| 2008/0093560 A1* | 4/2008 | Puhakka | H01L 27/14634 250/370.08 |
| 2008/0246963 A1* | 10/2008 | Nakajima | G01N 15/0205 356/336 |
| 2009/0153865 A1* | 6/2009 | Owa | G01N 21/274 356/440 |
| 2009/0310122 A1 | 12/2009 | Hamada et al. | |
| 2010/0238442 A1* | 9/2010 | Heng | G01J 3/02 356/343 |
| 2011/0317039 A1 | 12/2011 | Ise | |
| 2012/0200857 A1* | 8/2012 | Sharpe | G01N 15/1404 356/436 |
| 2012/0305751 A1* | 12/2012 | Kusuda | H04N 5/378 250/208.1 |
| 2013/0050782 A1* | 2/2013 | Heng | G01N 15/1434 358/494 |
| 2013/0090564 A1* | 4/2013 | Tateishi | A61B 5/0261 600/479 |
| 2014/0241506 A1* | 8/2014 | Iwashita | G01T 1/16 378/91 |
| 2014/0309782 A1* | 10/2014 | Sharpe | G05D 21/02 700/266 |
| 2015/0140123 A1* | 5/2015 | Mueller | G01N 33/5014 424/649 |
| 2015/0281613 A1 | 10/2015 | Vogelsang et al. | |
| 2015/0350573 A1* | 12/2015 | Toda | H04N 5/341 348/241 |
| 2016/0028985 A1 | 1/2016 | Vogelsang et al. | |
| 2016/0118424 A1 | 4/2016 | Guidash et al. | |
| 2016/0216381 A1 | 7/2016 | Nishihara et al. | |

FOREIGN PATENT DOCUMENTS

| | | |
|---|---|---|
| JP | 2012-015599 A | 1/2012 |
| JP | 2014-139564 A | 7/2014 |
| JP | 2015-530855 A | 10/2015 |
| JP | 2016-513942 A | 5/2016 |
| JP | 2016-526817 A | 9/2016 |
| WO | 2014/055280 A2 | 4/2014 |
| WO | 2014/055391 A2 | 4/2014 |
| WO | 2014/097546 A1 | 6/2014 |
| WO | 2014/144391 A1 | 9/2014 |
| WO | 2014/200939 A1 | 12/2014 |

OTHER PUBLICATIONS

International Search Report and Written Opinion of PCT Application No. PCT/JP2017/004953, dated May 9, 2017, 10 pages of ISRWO.

* cited by examiner

FIG. 7

| −14 | 24 | 13 | 0 | 26 |
|---|---|---|---|---|
| 6 | 17 | 4 | 26 | 33 |
| 3 | 6 | 6 | 11 | 5 |
| 21 | 9 | 1 | 7 | 10 |
| 29 | 26 | −3 | −3 | 7 |

FIG. 8

|  | PHOTOMULTIPLIER TUBE | PRESENT DISCLOSURE |
|---|---|---|
| NUMBER OF INCIDENT PHOTONS (Ph) | 2000 | 2000 |
| QUANTUM EFFICIENCY (QE) | 30% | 80% |
| SIGNAL CHARGE (SQ) [e-] (=Ph x QE) | 600 | 1600 |
| LIGHT SHOT NOISE (PSN) [e-rms] | 24 | 40 |
| FLOOR NOISE (FN) [e-rms] | 0 | 20 |
| MEASUREMENT RESOLUTION [FWHM %] ($2.35 \ast (PSN^2 + FN^2)^{0.5} / SQ$) | 10% | 7% |

OPTICAL MEASURING INSTRUMENT, FLOW CYTOMETER, AND RADIATION COUNTER

CROSS REFERENCE TO RELATED APPLICATIONS

This application is a U.S. National Phase of International Patent Application No. PCT/JP2017/004953 filed on Feb. 10, 2017 which claims priority benefit of Japanese Patent Application No. JP 2016-032718 filed in the Japan Patent Office on Feb. 24, 2016. Each of the above-referenced applications is hereby incorporated herein by reference in its entirety.

TECHNICAL FIELD

The present disclosure relates to an optical measuring instrument, a flow cytometer, and a radiation counter, and especially relates to an optical measuring instrument, a flow cytometer, and a radiation counter capable of realizing stable operation at a low voltage and improved throughput while making a device configuration compact.

BACKGROUND ART

A flow cytometer attracts attention which wraps a specimen such as a cell in a sheath flow and allows the same to pass through a flow cell, irradiates the same with a laser beam or the like, and obtains a characteristic of each specimen from scattered light or excited fluorescence.

The flow cytometer may quantitatively examine a large number of specimens in a short time to count blood cells and detect various types of specimen abnormality, virus infection and the like by attaching various fluorescent labels to the specimen. In addition, this is also applied to antibody testing and DNA testing by using magnetic beads to which an antibody or deoxyribo nucleic acid (DNA) is attached as the specimen, for example.

Such fluorescence or scattered light is detected as pulsed light each time an individual specimen passes through a beam spot. Since intensity of the laser beam is suppressed so as not to damage the specimen, side scattered light and fluorescence are very weak.

Therefore, a photomultiplier tube is used in general as a detector of such light pulse. Also, as a light pulse detector, a method of amplifying a fluorescence spectrum by an image intensifier and detecting the same with a charge coupled device (CCD) is also proposed (refer to Patent Document 1). Furthermore, a method of using an Avalanche photodiode (APD) as a photodetector is also proposed (refer to Patent Document 2).

Since the flow cytometer may obtain a great deal of information such as detecting various infectious diseases and early cancer only by blood testing, it is expected that the flow cytometer is made compact and widely spread.

Also, throughput of the testing is improved with a flow rate of the specimen, but at the same time a pulsed light interval narrows, so that it is necessary to detect the pulsed light at a higher speed and with higher sensitivity.

CITATION LIST

Patent Document

Patent Document 1: Japanese Patent Application Laid-Open No. 6-43090
Patent Document 2: Japanese Patent Application Laid-Open No. 2006-313151

SUMMARY OF THE INVENTION

Problems to be Solved by the Invention

However, since the photomultiplier tube requires a high voltage of 1000V and a power supply which meets this is necessary, a device configuration becomes large.

Also, since the flow cytometer mounts a plurality of photodetectors corresponding to a plurality of types of fluorescence detection in general, the use of the photomultiplier tube increases a size of an entire device.

Furthermore, even in a case of using the CCD, it is not easy to reduce the size and weight of an image intensifier.

Also, all of the photodetectors are of analog outputs and are susceptible to external noise.

Especially, in the APD, a gain of a signal significantly fluctuates due to fluctuation in temperature and applied voltage, and noise resistance is low because of a weak output signal. Also, the photomultiplier tubes also have low magnetic field resistance.

On the other hand, although detection throughput of the CCD is defined by a frame rate, they are constrained by CCD transfer of a vertical register and a horizontal register.

Also, as for the photomultiplier tube and the APD, the output thereof reflects a response of a light amount in time series, so that this is amplified and shaped, and a plurality of times of analog to digital (AD) conversion is performed over time, and a total light amount is derived from integration thereof.

Therefore, the throughput is restricted by performance of an external AD converter.

The present disclosure is achieved in view of such circumstances, and an object thereof is to improve the throughput by reducing the size and weight of the photodetector as well as improving the accuracy and rate of the weak pulsed light detection, and realize application to other optical measuring instruments using light pulses.

Solutions to Problems

An optical measuring instrument according to one aspect of the present disclosure is an optical measuring instrument provided with a light pulse generation unit which generates a light pulse of intensity according to a state of an object to be measured, a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels, and a control unit which controls an accumulation timing of the charges of the plurality of pixels in the photodetection unit in synchronization with incidence of the light pulse.

The control unit may control the photodetection unit to allow the plurality of pixels to simultaneously complete the accumulation of the charges at a timing at which the incidence of the light pulse starts or a timing after elapse of predetermined time from a timing at which the incidence of the light pulse is completed and output the pixel signals, and to detect the light amount of the light pulse based on the pixel signals.

The plurality of pixels may be divided into a plurality of pixel groups, and the control unit may control the photodetection unit to allow each of the pixel groups to simultaneously complete the accumulation of the charges at a timing at which the incidence of the light pulse starts or at a timing after elapse of predetermined time from a timing at which the incidence of the light pulse is completed and allow each of the pixel groups to output the pixel signals, and to detect the light amount of the light pulse based on the pixel signals.

The control unit may control the photodetection unit to allow one or the other of the plurality of pixel groups to simultaneously complete the accumulation of the charges at a timing at which the incidence of the light pulse starts or a timing after elapse of predetermined time from a timing at which the incidence of the light pulse is completed and allow the one or the other of the pixel groups to output the pixel signals, and to detect the light amount of the light pulse based on the pixel signals, and alternately change the one or the other of the pixel groups each time the light pulse is incident.

The control unit may control the photodetection unit to allow the same or different pixel group to simultaneously start new accumulation substantially at the same time as the accumulation of the charges is completed.

The photodetection unit may include a plurality of signal detection units each of which reads out pixel signals of one or more predetermined number of pixels by switching the pixels to convert into digital signals, and the photodetection unit may control the plurality of signal detection units to read out pixel signals of a part of the predetermined number of pixels to convert into the digital signals, and detect the light amount of the light pulse based on the pixel signals of the part of pixels.

The photodetection unit may include a pixel array in which the pixels are arranged in an array, and control the plurality of signal detection units to read out pixel signals of a part of pixels in a specific range in the pixel array out of the predetermined number of pixels to convert into the digital signals, and detect the light amount of the light pulse based on the pixel signals of the part of pixels.

A plurality of photodetection units are provided, a dispersing unit which disperses the light pulse to the plurality of photodetection units, and a condensing unit which condenses the light pulses dispersed to the plurality of photodetection units by the dispersing unit to a specific range in the pixel array in the photodetection unit to apply are provided, in which the plurality of photodetection units may detect the light amount of the light pulse based on the pixel signals of the part of the pixels in an allocated period among divided periods in a period from when the incidence of the light pulse starts to when the incidence is completed.

The signal detection unit may be connected to the pixels in an on-chip manner.

Each of the pixels may include a plurality of detection nodes in which the charges subjected to the photoelectric conversion by the photoelectric conversion element are sequentially accumulated for a predetermined period and the accumulated charges after the accumulation is completed are transferred for one photoelectric conversion element; and the control unit may control the photodetection unit to allow the pixels to simultaneously complete the accumulation of the charges at a timing at which the incidence of the light pulse starts or a timing after elapse of predetermined time from a timing at which the incidence of the light pulse is completed to transfer to any of the plurality of detection nodes and output the pixel signals of the pixels on the basis of the accumulated charges transferred to the detection nodes, and to detect the light amount of the light pulse based on the pixel signals, and may periodically switch a detection node to which the accumulated charges are transferred among the plurality of detection nodes each time the light pulse is incident.

The light pulse may be fluorescence or scattered light generated when a laser beam is applied to a specimen in a fluid which passes through a flow cell.

The photodetection unit may detect the fluorescence or scattered light generated when the laser beam is applied to the specimen in the fluid which passes through the flow cell, the light pulse observed in a direction substantially perpendicular to a travel direction of the laser beam.

A front photodetection unit which detects the light pulse generated when the laser beam is applied to the specimen in the fluid which passes through the flow cell in a direction substantially in front of a light source of the laser beam may be further provided, and the control unit may detect a timing at which the incidence of the light pulse starts or a timing at which the incidence is finished according to a level of the light pulse detected by the front photodetection unit.

The light pulse may be scintillation light when a radiation is incident on a scintillator.

A flow cytometer according to one aspect of the present disclosure is a flow cytometer provided with a light pulse generation unit which generates a light pulse of intensity according to a state of an object to be measured, a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels, and a control unit which controls an accumulation timing of the charges of the plurality of pixels in the photodetection unit in synchronization with incidence of the light pulse.

A radiation counter according to one aspect of the present disclosure is a radiation counter provided with a light pulse generation unit which generates a light pulse of intensity according to a state of an object to be measured, a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels, and a control unit which controls an accumulation timing of the charges of the plurality of pixels in the photodetection unit in synchronization with incidence of the light pulse.

In one aspect of the present disclosure, a light pulse of intensity according to a state of an object to be measured is generated, a photoelectric conversion element and an amplification element are included, charges subjected to photoelectric conversion by the photoelectric conversion element is sequentially accumulated for a predetermined period, a voltage according to an accumulated charge amount after accumulation is competed is output from a plurality of pixels as a pixel signal through the amplification element, the light pulse is received, a light amount of the light pulse is detected on the basis of the pixel signals output from the plurality of pixels, and an accumulation timing of the charges of the plurality of pixels is controlled in synchronization with incidence of the light pulse.

Effects of the Invention

According to one aspect of the present disclosure, it is possible to realize stable operation at a low voltage and improvement in throughput while making the device configuration small.

BRIEF DESCRIPTION OF DRAWINGS

FIG. 7 is a view for illustrating a signal output example in a pixel array of the imaging element in FIG. 2.

FIG. 8 is a view for illustrating detection resolution of a visible light pulse of the flow cytometer in FIG. 1.

MODE FOR CARRYING OUT THE INVENTION

Figure 1:
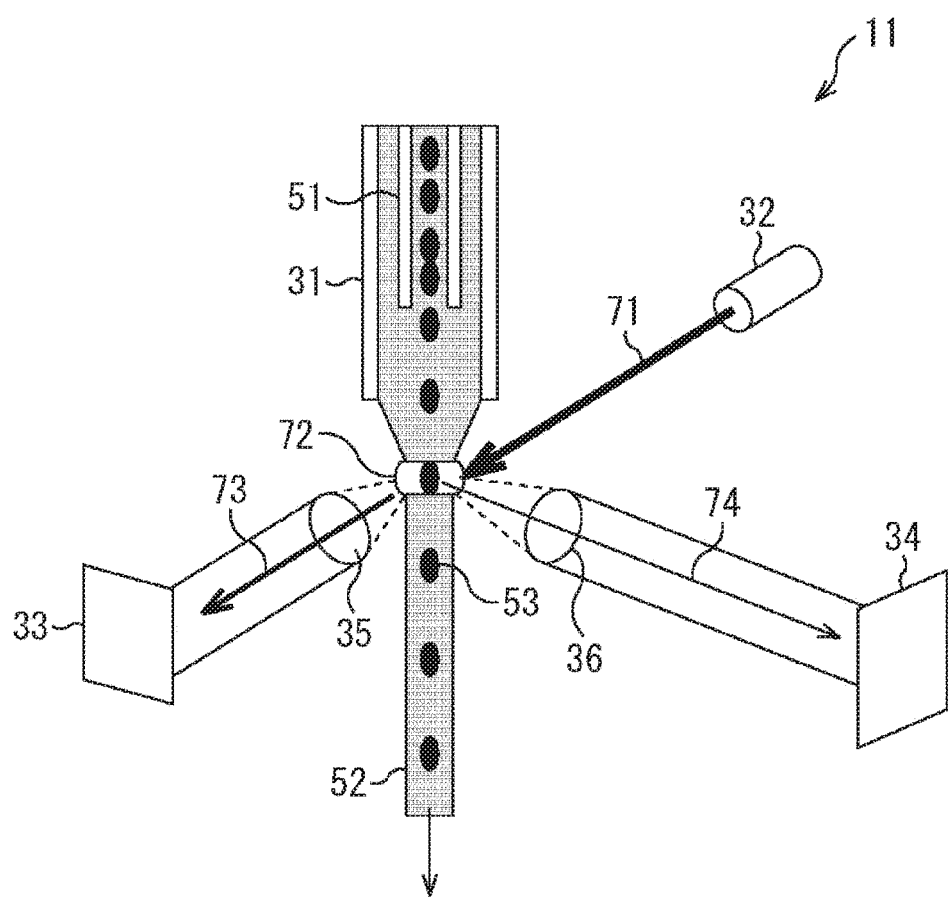
FIG. 1 is a view illustrating a configuration example of a flow cytometer to which the technology of the present disclosure is applied.

Preferred embodiments of the present disclosure are hereinafter described in detail with reference to the accompanying drawings. Meanwhile, in this specification and the drawings, the components having substantially the same functional configuration are assigned with the same reference sign, and the description thereof is not repeated.

Also, the description is given in the following order.
1. First Embodiment
2. Second Embodiment
3. Third Embodiment
4. Fourth Embodiment 1. First Embodiment First, a configuration example of a flow cytometer of the present disclosure is described with reference to FIG. 1.

A flow cytometer 11 includes a flow cell 31, a laser beam source 32, a photo diode 33, a photodetector 34, and condenser lenses 35 and 36.

A cylindrical flow cell 31 is provided on an upper part of the drawing into which a sample tube 51 is substantially coaxially inserted. The flow cell 31 has a structure in which a sample flow 52 flows downward in the drawing, and further a specimen 53 including cells and the like is discharged from the sample tube 51. As a result, the specimen 53 flows down in a line on the sample flow 52 in the flow cell 31.

In contrast, the laser beam source 32 generates a laser beam 71 and irradiates an irradiation spot 72 set in a position through which the specimen 53 passes with the same.

As a result, the specimen 53 is irradiated with the laser beam 71 and scattered light and fluorescence excited from a fluorescent marker or the like are generated, so that forward scattered light 73 and side scattered light or fluorescence 74 emitted from the fluorescent marker attached to the specimen are generated.

The forward scattered light 73 is incident on the condenser lens (also including a filter or the like) 35 and converted into parallel light to be incident on the photo diode 33. On the other hand, the side scattered light is incident on the condenser lens (also including a filter or the like) 36 and converted into parallel light to be incident on the photodetector 34.

Since the forward scattered light 73 with a large light amount may detect a size of the specimen 53 from a detection result of the photo diode 33, so that it is possible to detect passage of the specimen 53 and an event signal indicating that the specimen 53 passes is generated at a timing at which it is detected that the specimen 53 passes.

On the other hand, the side scattered light or the fluorescence 74 emitted from the fluorescent marker attached to the specimen being weak pulsed light is converted into the parallel light by the condenser lens 36 to be incident on the photodetector 34.

The photodetector 34 detects the side scattered light or the fluorescence 74 emitted from the fluorescent marker attached to the specimen incident as the weak pulsed light.

Herein, the photodetector 34 is an imaging element including a plurality of pixels incorporating an analog digital (AD) converter in the same semiconductor chip. Each pixel includes a photoelectric conversion element and an amplifier element (amplification element), and charges subjected to photoelectric conversion are accumulated in the pixel. A signal reflecting an accumulated charge amount is amplified through the amplifier element to be output at a desired timing, and is converted into a digital signal by the incorporated AD converter. Meanwhile, the photodetector 34 is hereinafter also referred to as the imaging element 34.

<First Configuration Example of Imaging Element>

Figure 2:
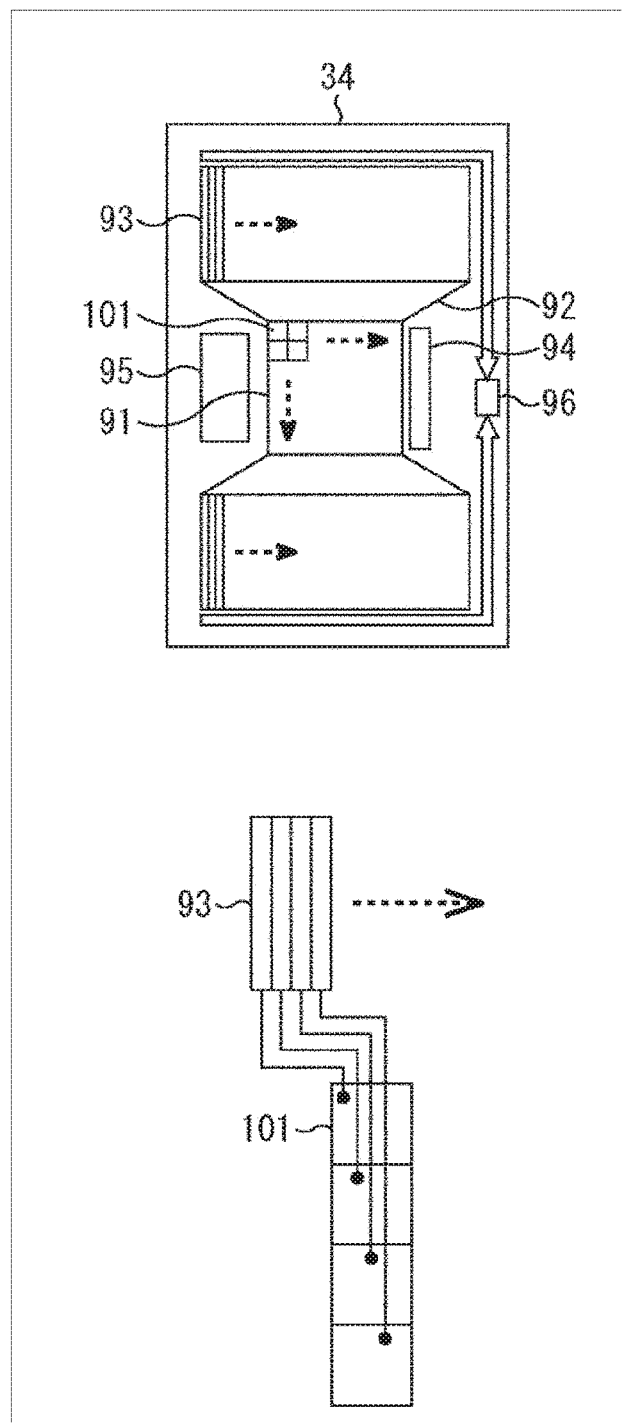
FIG. 2 is a view illustrating a first configuration example of an imaging element (photodetector) in FIG. 1.

Next, a configuration example of the imaging element (photodetector) 34 is described with reference to FIG. 2. Herein, a first configuration example of the imaging element 34 is illustrated in an upper part of FIG. 2, and a configuration example of a pixel 101 and a detection circuit 93 in a pixel array 91 in the imaging element 34 in the upper part of FIG. 2 is illustrated in a lower part of FIG. 2. Meanwhile, a size, the number, the number of rows, the number of columns and the like of the configuration used for the description in the configuration example of this embodiment as follows are merely an example, and other size, number, number of rows, number of columns and the like may also be used.

The imaging element 34 in FIG. 2 includes the pixel array 91, a connection unit 92, the detection circuit 93, a drive circuit 94, a logic circuit 95, and an output circuit 96.

The pixel array 91 is obtained by arranging pixels (pixel circuits) 101 each having a size of, for example, 30 μm×30 μm in an array of, for example, 40 pixels×40 pixels, and an aperture of 1.2 mm×1.2 mm as a whole is realized. The fluorescence 74 and the like emitted from the irradiation spot 72 is condensed on the pixel 101 in the pixel array 91 via the condenser lens 36 and the like to be applied thereto. The pixel 101 generates a pixel signal corresponding to an irradiated light amount, and this is read out by the detection circuit 93.

The detection circuit 93 is a circuit which detects the pixel signal output from the pixel 101 including the analog digital (AD) converter, and in this example, 800 detection circuits are arranged in columns at a pitch of 3 μm, for example. They are connected to the pixels 101 of 20 rows on a one-to-one basis via the connection unit 92 according to an arrangement configuration illustrated in the lower part of FIG. 2. That is, the 800 detection circuits 93 are connected to the pixels 101 of 40 columns×20 rows corresponding to an upper half of the pixel array 91 on a one-to-one basis.

Furthermore, similar 800 detection circuits 93 are arranged also in a lower half of the pixel array 91, and they are connected to the pixels 101 of 40 columns×20 rows corresponding to the lower half of the pixel array 91 on a one-to-one basis.

In the pixel 101, the generated pixel signals are simultaneously read out as accumulation signals, simultaneously converted into digital signals by the AD converter of the detection circuit 93, and are sequentially output via the output circuit 96. Each pixel 101 is driven by the drive circuit 94, and a drive timing thereof and drive timings of the detection circuit 93 and the output circuit 96 are controlled by the logic circuit 95.

Meanwhile, since many wires pass through the pixel 101 for connection to the detection circuit 93, in order to prevent deterioration in aperture ratio of the pixel by them, the pixel 101 may have a so-called rear surface irradiation type configuration in which a wiring layer is formed on a rear surface of a photoelectric conversion layer.

In such a device configuration, a large number of pixel signal outputs are parallelly and integrally transmit to the AD converter incorporated in an on-chip manner directly without a delay step such as charge coupled device (CCD) transfer. Therefore, in the pixel 101, readout of the pixel signal and AD conversion processing may be realized at a high speed.

Meanwhile, an amplification circuit such as an operational amplifier may further be inserted between the pixel signal output and the AD converter.

<Configuration Example of Pixel Circuit of Imaging Element in FIG. 2>

Next, a configuration example of the pixel circuit of the pixel 101 of the imaging element 34 in FIG. 2 is described with reference to FIG. 3.

A circuit configuration of the pixel 101 is provided with a photo diode (PD) 111, an accumulation node 112, a transfer transistor 113, an amplification transistor 114, a selection transistor 115, a reset transistor 116, and a detection node 117. For example, an N-type metal-oxide semiconductor (MOS) transistor is used as the transfer transistor 113, the amplification transistor 114, the selection transistor 115, and the reset transistor 116.

The photo diode 111 converts photons into charges by the photoelectric conversion. The photo diode 111 is connected to the transfer transistor 113 via the accumulation node 112. The photo diode 111 generates pairs of electrons and holes from the photons incident on a silicon substrate of the circuit of the pixel 101, and accumulates the electrons out of them in the accumulation node 112 corresponding to a cathode. It is desirable that the photo diode 111 be of an embedded type in which the accumulation node 112 is completely depleted at the time of charge discharge by resetting.

The transfer transistor 113 transfers the charge from the accumulation node 112 to the detection node 117 under the control of a row drive circuit 121. The detection node 117 accumulates the charges from the transfer transistor 113 and generates an analog voltage corresponding to the accumulated charge amount. This voltage is applied to a gate of the amplification transistor 114.

The reset transistor 116 extracts the charges accumulated in the accumulation node 112 and the detection node 117 to a power supply 118 to initialize them. A gate of the reset transistor 116 is connected to the row drive circuit 121, a drain thereof is connected to the power supply 118, and a source thereof is connected to the detection node 117.

For example, the row drive circuit 121 controls the reset transistor 116 to be in an on-state simultaneously with the transfer transistor 113, thereby extracting the electrons accumulated in the accumulation node 112 to the power supply 118, thereby initializing the pixel 101 to a dark state before accumulation, that is, a state in which light is not yet incident. Also, the row drive circuit 121 controls only the reset transistor 116 to be in the on-state, thereby extracting the charges accumulated in the detection node 117 to the power supply 118 to initialize a charge amount thereof.

The amplification transistor 114 amplifies a gate voltage. The gate of the amplification transistor 114 is connected to the detection node 117, a drain thereof is connected to the power supply, and a source thereof is connected to the selection transistor 115. The amplification transistor 114 and a constant current circuit 122 form a source follower, and a voltage of the detection node 117 is output to a vertical signal line 124 with a gain of slightly less than one. An electric signal of the voltage of the detection node 117 is obtained by a detection circuit 123 including an AD conversion circuit.

The selection transistor 115 outputs an electric signal under the control of the row drive circuit 121. A gate of the selection transistor 115 is connected to the row drive circuit 121, a drain thereof is connected to the amplification transistor 114, and a source thereof is connected to the vertical signal line 124.

Meanwhile, in a case where the detection circuit 93 is installed in each pixel 101 on a one-to-one basis as in the example in FIG. 2, the selection transistor 115 may be omitted and the source of the amplification transistor 114 may be directly connected to the vertical signal line 124.

The pixel 101 accumulates the charges subjected to the photoelectric conversion inside thereof during a period from when the photo diode 111 is reset until the readout, and outputs a signal corresponding to the accumulated charges at the time of readout. When accumulation and readout of such a unit period are repeated and a light pulse is incident during the accumulation, it is possible to obtain an output result corresponding to the light amount at the time of readout.

A characteristic of such embedded-type photo diode is that the detection node 117 and the accumulation node 112 of the photo diode 111 are not capacitively coupled at the time of readout. As a result, as parasitic capacitance of the detection node 117 is reduced, conversion efficiency is improved and sensitivity to one-photon incidence may be improved. Also, even when the photo diode 111 becomes huge, the conversion efficiency is not deteriorated. Therefore, as the photo diode 111 becomes huger, the sensitivity per pixel for the same light flux density may be improved. Meanwhile, the similar property is also observed in MOS type photoelectric conversion elements.

Also, such a pixel generally is not accompanied with electron multiplication as in an APD, a Si-PM, and a photomultiplier tube. Therefore, the output of such a pixel is affected by readout noise caused by the amplification transistor 114 and the AD conversion circuit on a subsequent stage, but by maximizing the pixel sensitivity using the above-described property, the effect is relatively minimized.

That is, a signal to noise ratio (SN) of the pixel is maximized by reducing the parasitic capacitance of the detection node 117 as much as possible and enlarging the photo diode 111 as much as possible within a range in which one electron transfer is possible, and the pixel as a high sensitivity detector used in the present disclosure is realized.

Figure 3:
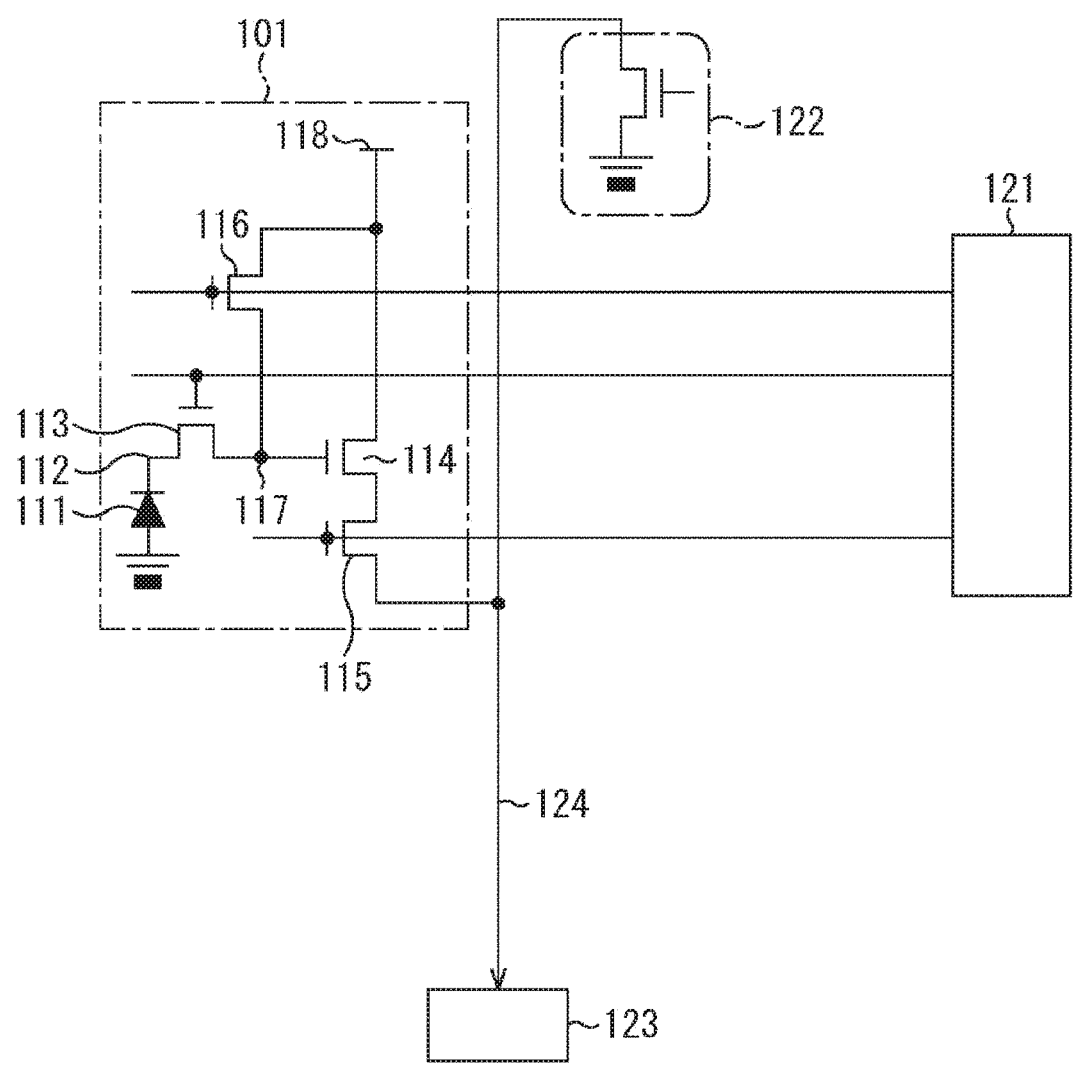
FIG. 3 is a view illustrating a configuration example of a pixel (pixel circuit) of the imaging element in FIG. 2.

Meanwhile, the row drive circuit 121 in FIG. 3 is, for example, a part of the pixel drive circuit 94 in FIG. 2, and the detection circuit 123 and the constant current circuit 122 are a part of the detection circuit 93 in FIG. 2.

<First Operation Example of Pixel Circuit of Imaging Element in FIG. 2>

Next, a first operation example of the pixel circuit forming the pixel 101 of the imaging element 34 in FIG. 2 is described with reference to a timing chart in FIG. 4.

At timing T41, the row drive circuit 121 controls the transfer transistor 113 and the reset transistor 116 to be in the on-state at a timing immediately before the accumulation period. By this control, all the charges accumulated in the accumulation node 112 between the photo diode 111 and the transfer transistor 113 are discharged to the power supply. Meanwhile, hereinafter, this control is referred to as "photo diode (PD) reset".

Thereafter, the row drive circuit 121 controls the transfer transistor 113 to be in an off-state. By this control, the accumulation node 112 is put into a floating state and charge accumulation is newly started.

Also, the row drive circuit 121 controls the reset transistor 116 to be in an off-state after the PD reset. By this control, electric potential of the detection node 117 is somewhat lowered from reference potential by coupling to a gate of the reset transistor 116, and is put into a floating state.

Furthermore, at that time, significant kTC noise occurs in the detection node 117. A floating diffusion layer (Floating Diffusion) is used in general as the detection node 117, so that this control is hereinafter referred to as "FD reset". In this example, the PD reset and FD reset are performed consecutively.

Next, at timing T42, the selection transistor 115 connects the circuit of the pixel 101 and the vertical signal line 124. As a result, the voltage of the detection node 117 is amplified by the amplification transistor 114 and is output to the vertical signal line 124.

The detection circuit 123 performs sampling at least once (for example, four times). In the sampling, a signal of electric potential of the vertical signal line 124 is converted into a digital signal Ds1 by the detection circuit 123 as a reset signal. Multiple sampling of the reset signal is treated as first readout in correlated double sampling.

Then, at timing T43, the row drive circuit 121 controls the transfer transistor 113 to be in the on-state immediately before the accumulation period ends. By this control, the charges accumulated in the accumulation node 112 are transferred to the detection node 117. At that time, if the potential of the detection node 117 is sufficiently deep, all the electrons accumulated in the accumulation node 112 are transferred to the detection node 117, and the accumulation node 112 is put into a completely depleted state.

Also, when the pulse period elapses from timing T43, the row drive circuit 121 controls the transfer transistor 113 to be in the off-state. By this control, the electric potential of the detection node 117 decreases by an amount of the accumulated charges (that is, the potential becomes shallower) in comparison with that before driving the transfer transistor 113.

Next, at timing T44, the selection transistor 115 connects the circuit of the pixel 101 and the vertical signal line 124. As a result, the voltage corresponding to the decrease is amplified by the amplification transistor 114 and is output to the vertical signal line 124.

Herein, the detection circuit 123 performs sampling at least once (for example, four times). In the sampling, the signal of the electric potential of the vertical signal line 124 is converted into a digital signal Ds2 by the detection circuit 123 as the accumulation signal. Multiple sampling of this accumulation signal is treated as second readout in correlated double sampling.

The detection circuit 123 compares the sampled accumulation signal (that is, the digital signal Ds2) and the reset signal (that is, the digital signal Ds1) and determines an incident photon amount on the basis of a comparison result. All of a plurality of digital signals Ds1 are added, and an average value thereof is calculated as necessary. Similarly, all of the digital signal Ds2 are also added and is averaged as necessary.

The detection circuit 123 obtains a difference between an added value (or average value) of the digital signals Ds1 and an added value (or average value) of the digital signals Ds2 as a net accumulation signal. The kTC noise generated at the time of the FD reset is canceled by setting the difference between the digital signals Ds1 and Ds2 as the net accumulation signal.

An exposure accumulation period of each pixel (pixel circuit) 101 is a period between the PD reset operation and the accumulation signal readout operation described above, and to be precise, a period after the transfer transistor 113 is turned off after the reset until this is turned off after the readout. When the photon is incident on the photo diode 111 and the charge is generated in this accumulation period, this becomes the difference between the reset signal and the accumulation signal and is derived by the detection circuit 123 according to the above-described procedure.

That is, the detection circuit 123 has a so-called correlated double sampling (CDS) function, and cancels low frequency noise of the pixel including the kTC noise by this. Also, the detection circuit 123 performs the CDS between digital values passing through the AD converter, thereby also canceling noise mixed in association with an AD conversion process.

<Second Operation Example of Pixel Circuit of Imaging Element in FIG. 2>

In the above-described example, during a period after the unit accumulation is competed until next accumulation is started, especially in the sampling period of the accumulation signal, a dead period during which the accumulation is not performed occurs. Therefore, especially in order to deal with high-speed sampling, such dead period may be eliminated.

Figure 5:
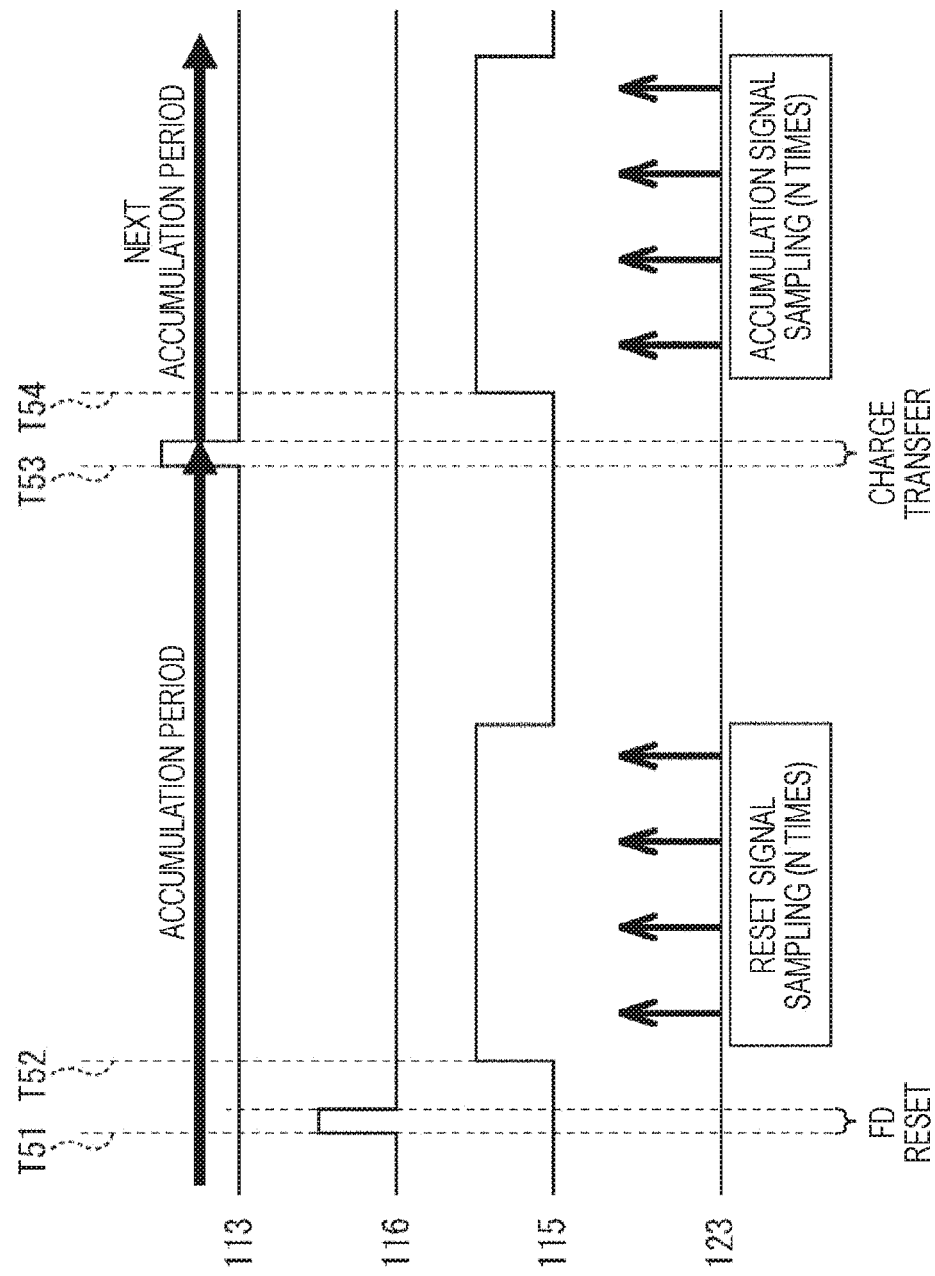
FIG. 5 is a second timing chart for illustrating the operation of the pixel circuit in FIG. 3.

FIG. 5 illustrates a second operation example of the pixel (pixel circuit) 101 of the imaging element 34 in FIG. 2 in which such dead period is eliminated especially in order to deal with the high-speed sampling.

Figure 4:
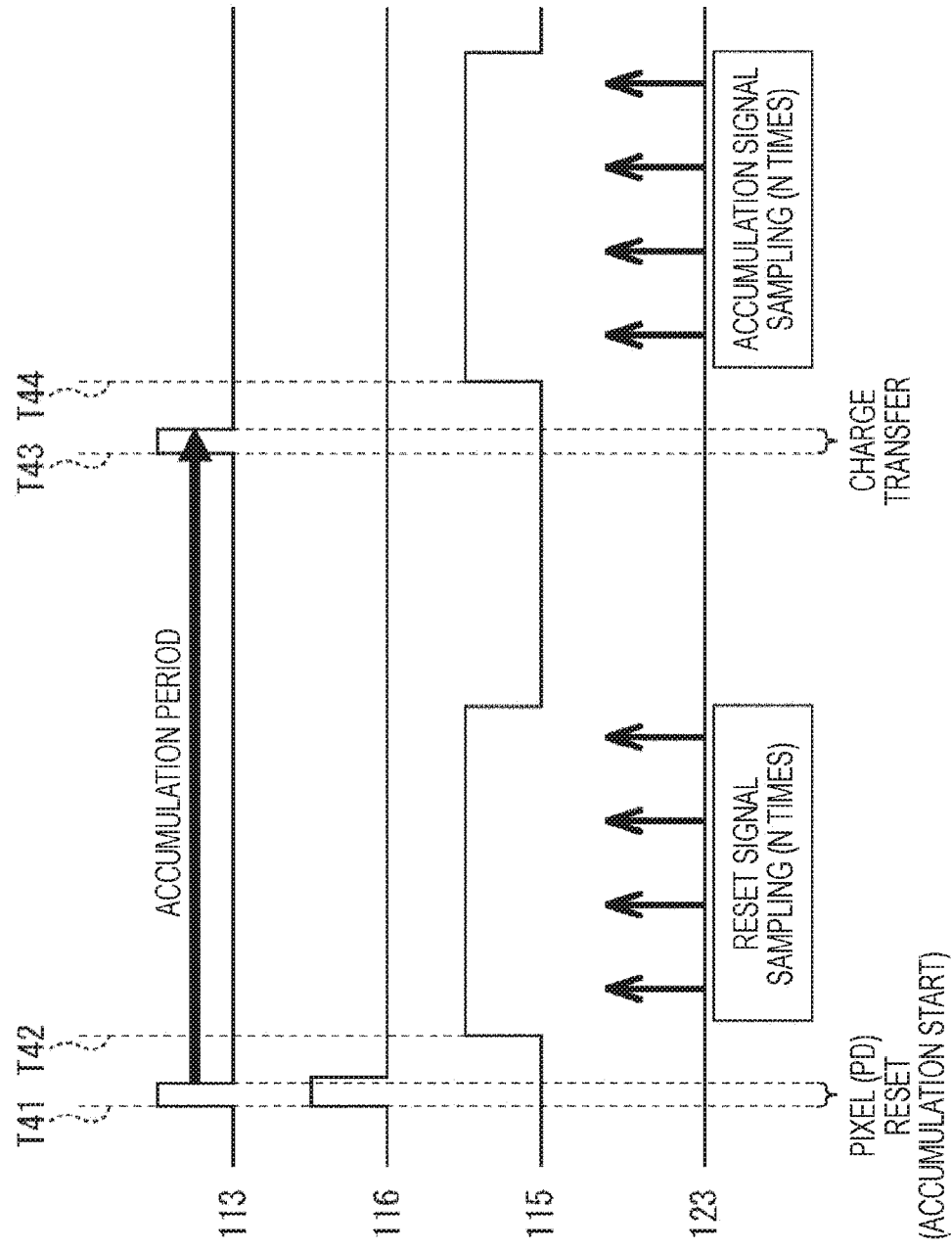
FIG. 4 is a first timing chart for illustrating operation of the pixel circuit in FIG. 3.

In the example in FIG. 5, the PD reset at timing T41 performed in FIG. 4 is omitted, and the charge discharge of the PD 111 in association with the charge transfer at timing T43 at the time of readout also serves as this.

That is, at timing T51 corresponding to timing T41 in FIG. 4, only the FD reset is performed. Then, at timing T52 corresponding to timing T42, the sampling of the reset level is performed. At that time, pulse application to the transfer transistor 113 is not performed, and the accumulated charges of the PD 111 are held as they are.

Then, at timing T53, the pulse is applied to the transfer transistor 113 and the transfer of the accumulation signal to the detection node 117 is performed; this charge discharge is also serves as the PD reset. At that time, a next accumulation period of the PD 111 starts immediately after that. As a result, the dead period during which the photons incident on the pixel 101 are not detected becomes almost zero.

Meanwhile, in any of the operation examples of FIGS. 4 and 5, the shortest cycle of the unit accumulation is defined by total required time of the sampling of a reset level and the sampling of an accumulation level.

<Operation Example of Pulsed Light Detection in Flow Cytometer in FIG. 1>

Next, an operation example of pulsed light detection in the flow cytometer 11 in FIG. 1 is described with reference to a timing chart in FIG. 6.

Figure 6:
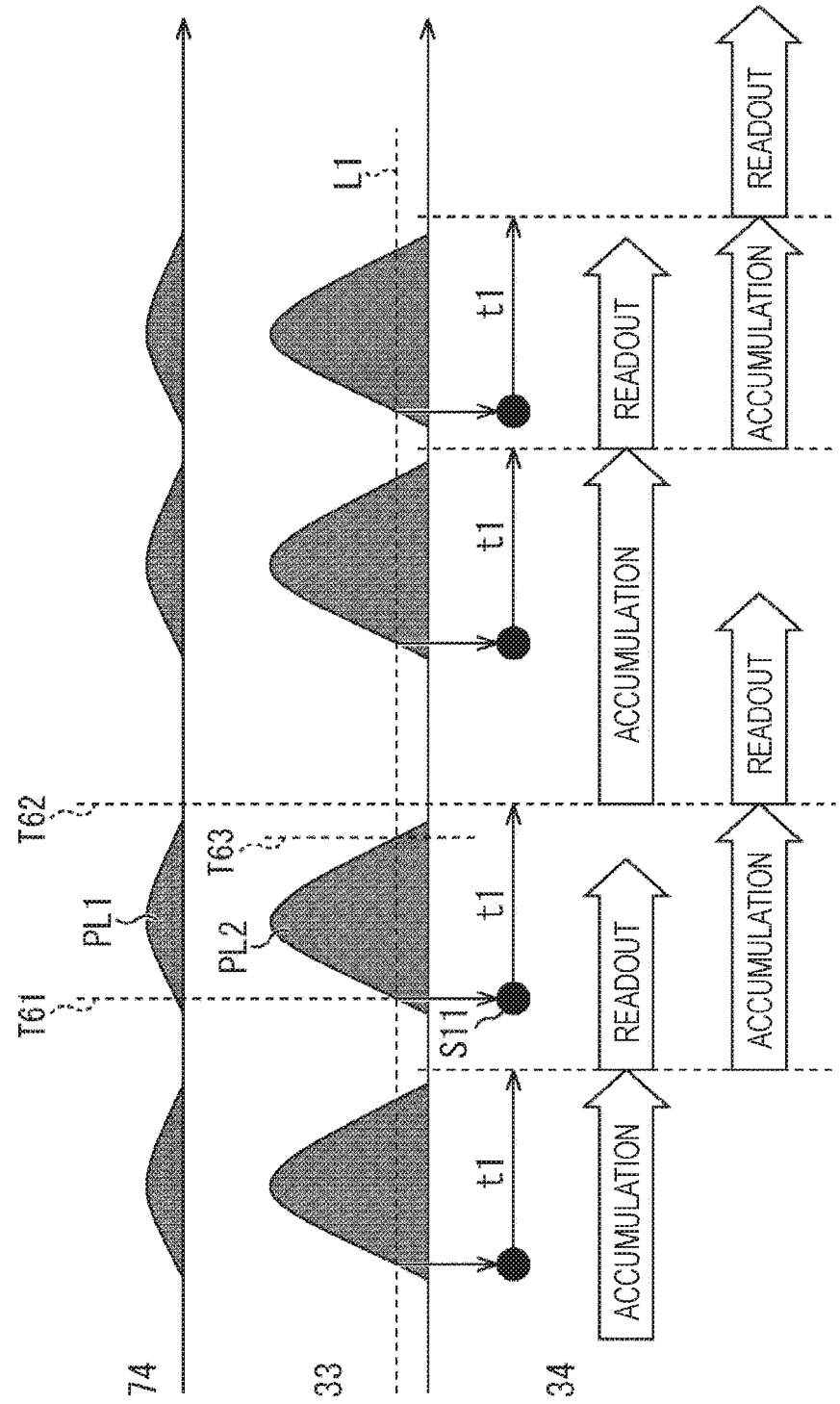
FIG. 6 is a timing chart for illustrating pulsed light detection operation of the flow cytometer in FIG. 1.

As the specimen 53 passes through the irradiation spot 72 of the laser beam, light intensity of the side scattered light or the fluorescence 74 is drawn as a pulse waveform PL1 as illustrated in the uppermost part of FIG. 6, and each pulse waveform PL1 is a waveform corresponding to the passage of one specimen 53. At that time, detected intensity of the forward scattered light 73 in the PD 33 illustrated in the middle of FIG. 6 is drawn like a pulse waveform PL2 which is similar in timing to the pulse waveform PL1 in the upper part of FIG. 6 and has high intensity.

At timing T61, the photo diode 33 obtains a passage timing of the specimen 53 from comparison between the intensity of the pulse waveform PL2 of the forward scattered light and a threshold L1, and generates an event signal S11.

Herein, the accumulation is completed and the output is read out in the imaging element (photodetector) 34 in synchronization with the event signal indicating that the specimen 53 passes. Access sequence of the readout is a global shutter with almost no dead period according to FIG. 5.

That is, the accumulation is started and finished simultaneously for all the pixels. At that time, in-pixel transfer is performed in synchronization with the event signal S11 indicating the passage of the specimen 53, and the accumulation period of all the pixels is finished at the same time. Then, the readout of the accumulation signal is started. Furthermore, at that time, the next accumulation period simultaneously starts in all the pixels.

At timing T62, the imaging element (photodetector) 34 completes the accumulation in the pixel, starts reading out the accumulation signal, and further starts the next accumulation. Herein, timing T62 is a timing after a lapse of certain delay t1 in consideration of a flow rate and size of the specimen 53 from timing T61 at which the event signal S11 is obtained.

The accumulation signal is read out together with acquisition of the difference between an AD converted value of the accumulation signal and an AD converted value of the reset signal already obtained, and the net accumulation signal obtained by canceling the kTC noise and the like is derived by this. Furthermore, subsequent to this, the reset signal is obtained and the AD conversion is performed in the next cycle, and the next accumulation is completed and the readout become possible when they are completed. That is, the shortest cycle of event processing is equal to the shortest cycle of the unit accumulation, which is determined by the time required for obtaining each of the accumulation signal and the reset signal and the AD conversion.

A total value of the net accumulation signals output from a plurality of pixels in each event processing corresponds to a total amount of photons received by the photodetector for each pulse. As a result, the intensity of the side scattered light and the fluorescence for each specimen is derived. That is, in the present disclosure, the incident light is integrated in the pixel by accumulating the charge obtained by the photoelectric conversion of the pixel therein. Therefore, it is sufficient to perform the AD conversion for each pixel output once, and it is not necessary to perform the AD conversion a plurality of times in time series.

For example, if it takes time of 10 μs for the AD conversion of the reset signal, the AD conversion of the accumulation signal, and acquisition of the difference therebetween, a minimum interval of the events which may be met is approximately 10 μs, so that up to 100,000 events, that is, the passages of the specimens 53 in the laser spot 72 per second may be evaluated.

Meanwhile, significant time is also required for transferring the net accumulation signal derived for each pixel 101 and detection circuit 123 to the output circuit 96 to output in the photodetector 34 illustrated in the upper part of FIG. 2, for example. However, by providing a register on the detection circuit 123 and temporarily storing the signals, they may be output in a pipeline manner in parallel with the AD conversion, so that output transfer does not restrict an accumulation cycle.

Also, in this example, the event signal S11 indicating that the specimen 53 passes is generated at leading timing T61 at which the pulse waveform PL2 exceeds the threshold L1; however, it is also possible that this is generated at trailing timing T63 at which the pulse waveform PL2 becomes lower than the threshold L1. There is an advantage that the event signal S11 is more easily respond to fluctuation in size and flow rate of the specimen 53 when this is generated at the trailing timing at which the pulse waveform PL2 becomes lower than the threshold L1. The event signal S11 may also be generated using the detection result of the side scattered light and the fluorescence 74; in this case, they are dispersed to be applied to another element for generating an event or the element for generating an event may be separately mounted in the photodetector 34.

Furthermore, although the delay t1 from the event signal S11 is herein made constant, in general, the intensity of the pulse waveform PL2 by the forward scattered light is higher as the specimen 53 is larger. Therefore, the intensity of the pulse waveform PL2 may be evaluated simultaneously from a rising state of the pulse, for example, and a length of the delay t1 may be set accordingly. In this case, a longer delay t1 is set for a larger specimen 53.

<Regarding Output Example of Pixel Signal in Imaging Element>

Next, an example of the output of the pixel signal of the pixel 101 in the imaging element (photodetector) 34 is described with reference to FIG. 7.

In FIG. 7, an example of the pixel signals to be read out is illustrated for a range of 5 pixels×5 pixels, for example. In further detail, when it goes from a left end to the right of an uppermost row and reaches a right end, and thereafter it goes down by one row and goes again from the left end to the right to read out, the signals are −14, 24, 13, 0, 26, 6, 17, 4, 26, 33, 3, 6, 6, 11, 5, 21, 9, 1, 7, 10, 29, 26, −3, −3, and 7.

Herein, one photon signal corresponds to 10 LSB (10 times the value of LSB), and a combination of the photon signal (one electron on average per pixel) and readout noise (0.5 electron rms per pixel) is output. A negative output might also be generated due to the noise. The value is herein represented as a negative value as it is, but it is also possible to apply offset to the whole to process or round up the same to zero.

That is, the photodetector 34 is an aggregate of high-sensitivity photodetection cells (pixels 101) each having a gradation output. In general, the pixel 101 does not perform electron multiplication by an intense electric field as in the APD or the photomultiplier tube, and the output signal is minute. Therefore, since this has significant readout noise, the number of incident photons in each pixel 101 is obscure. However, by combining these pixel outputs, a weak pulsed light amount is derived with a high degree of accuracy.

In FIG. 8, measurement resolution of the photomultiplier tube and that of the photodetector of the present disclosure when receiving a visible light pulse of a total of 2,000 photons are compared with each other. As for the photodetector 34 of the present disclosure, in a case where the readout noise per pixel 101 is set to 0.5 electron rms, floor noise of the pixel array 91 obtained by arraying the pixels 101 by 40 pixels×40 pixels is estimated to be $\sqrt{(0.5^2 \times 40 \times 40)} = 20$ electron rms.

Such floor noise is negligible in a multiplier-type photodetector such as the photomultiplier tube.

On the other hand, however, since the semiconductor (silicon) adopted in the present disclosure has high quantum efficiency with respect to a visible light area, it is possible to obtain many photoelectric conversion signals by that amount, and an influence of light shot noise is small. Looking overall, the photodetector of the present disclosure may obtain detection resolution substantially equal to or higher than that of the photomultiplier tube.

Furthermore, the photodetector 34 of the present disclosure has spatial resolution of 40 pixels×40 pixels. Such spatial resolution may detect, for example, a case where the specimen 53 deviates from the center of a flow path and disturbance occurs in the detection light, thereby masking or correcting erroneous detection.

Meanwhile, in a case of this example, assuming that the output of each pixel 101 is subjected to the AD conversion with 12-bit resolution, an output obtained by summing the pixels of 40 pixels×40 pixels is resolution of $12 + \log_2 (40 \times 40)$ 22 bits.

In addition, an increase in the number of pixels is required for enlarging a dynamic range of detection, and it is also necessary to increase the detection circuit 93 accordingly. In this case, in order to secure an installation area of the detection circuit, it is advantageous to increase the number of columns of pixels and make the pixel array 91 horizontally long. For example, in a case of the imaging element (photodetector) 34 of 110 rows×40 rows, the output resolution is improved to 24 bits. At that time, it is also desirable to adjust a shape of the condenser lens so that the light is uniformly condensed on a horizontally long light receiving surface.

<Third Operation Example of Pixel Circuit of Imaging Element in FIG. 2>

Next, a third operation example in which a high-speed mode is added in the imaging element 34 in FIG. 2 is described with reference to FIG. 9.

Herein, for example, by dividing the pixels 101 and the detection circuits 93 in FIG. 2 into upper and lower two systems, and by alternately accumulating, the accumulation cycle is shortened to ½ and event processing capacity is doubled.

However, since the exposure accumulation is performed only in half of the pixels at all times, the sensitivity is made ½.

Figure 9:
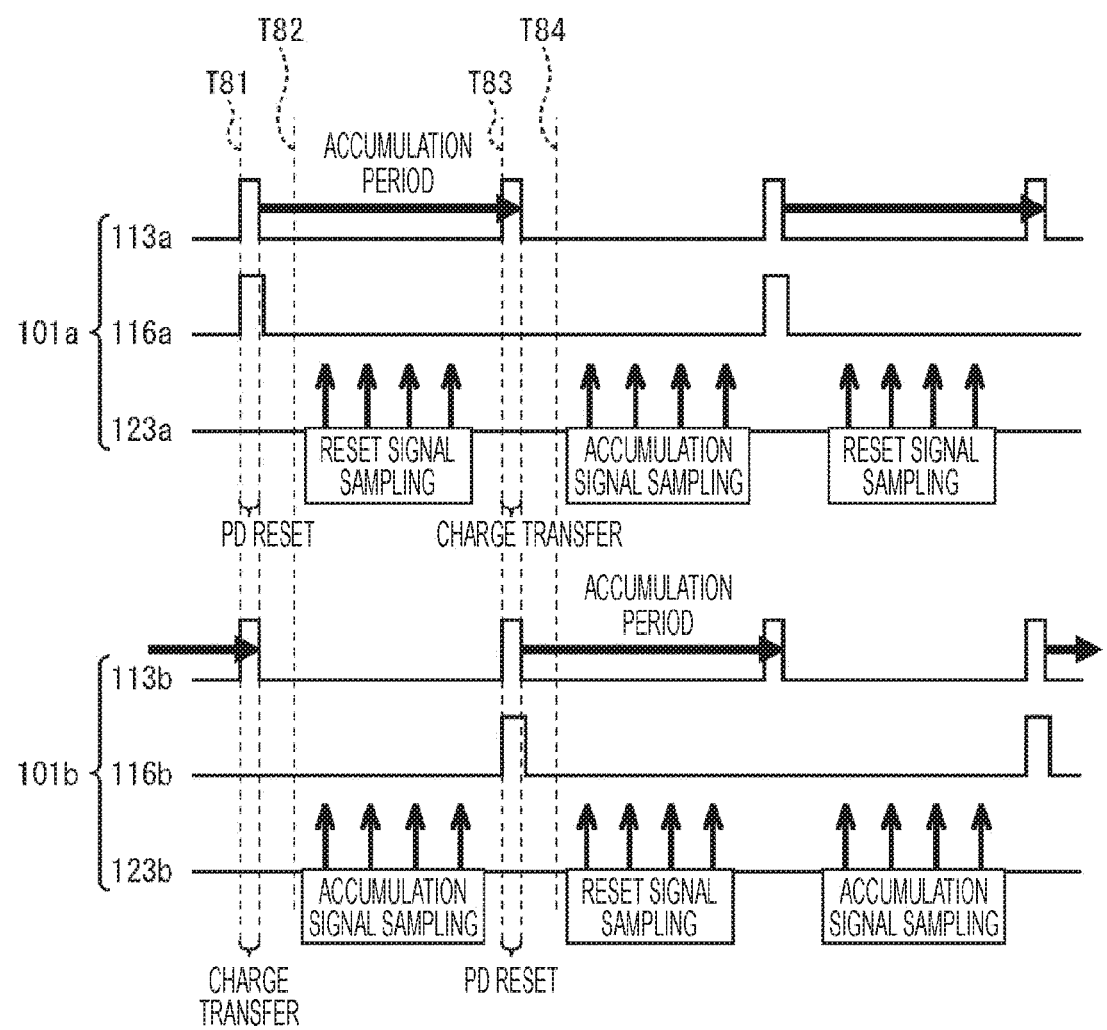
FIG. 9 is a third timing chart for illustrating the operation of the pixel circuit in FIG. 3.

Individual pixel operation in FIG. 9 conforms to that in the example in FIG. 4. However, the pixels 101 are divided into two systems of pixels 101*a* and 101*b*, and further, the exposure accumulation of the pixel 101*a* and that of the pixel 101*b* are alternately performed, so that the dead period as the photodetector is made substantially zero and the accumulation cycle is shortened to approximately ½.

That is, at timing T81, the PD reset is performed in the pixel 101*a* and the accumulated charges are transferred in the pixel 101*b*.

Next, at timing T82, sampling of the reset signal is performed on the side of the pixel 101*a*, and sampling of the accumulation signal is performed on the side of the pixel 101*b*.

Subsequently, at timing T83, the PD reset is performed in the pixel 101*b* and the accumulated charges are transferred in the pixel 101*a*.

Also, at timing T84, the sampling of the reset signal is performed on the pixel 101*b* side and the sampling of the accumulation signal is performed on the pixel 101*a* side.

With such a sequence, the accumulation cycle as the photodetector is shortened to approximately ½ while aligning basic timings of the AD conversion. At that time, the unit accumulation cycle is defined by the time required for the AD conversion of either the reset signal or the accumulation signal.

Meanwhile, it is further desirable to alternately arrange the pixels of the two systems for each row, so that even if the incident light has spatial distribution, the sensitivities of both may be made substantially uniform.

2. Second Embodiment

<Second Configuration Example of Imaging Element>

In the first configuration example of the pixel circuit described above, the number of detection circuits 93 is the same as the number of pixels, and they correspond to each other on a one-to-one basis. However, depending on the performance, cost, and function required for each application, the detection circuits 93 and the pixels 101 may correspond to each other on a one-to-many or many-to-one basis.

Therefore, a configuration of an imaging element 34 in which a detection circuit 142 (corresponding to the detection circuit 93) corresponds to pixels 151 (corresponding to the pixels 101) on a one-to-many (two, in this case) basis and a circuit configuration of the pixel 151 are next described with reference to FIG. 10. Herein, a second configuration example of the imaging element 34 is illustrated in an upper part of FIG. 10, and a configuration example of the pixels (pixel circuits) 151 in a pixel array 141 and the detection circuit 142 in the imaging element 34 in the upper part of FIG. 10 is illustrated in a lower part of FIG. 10.

Figure 10:
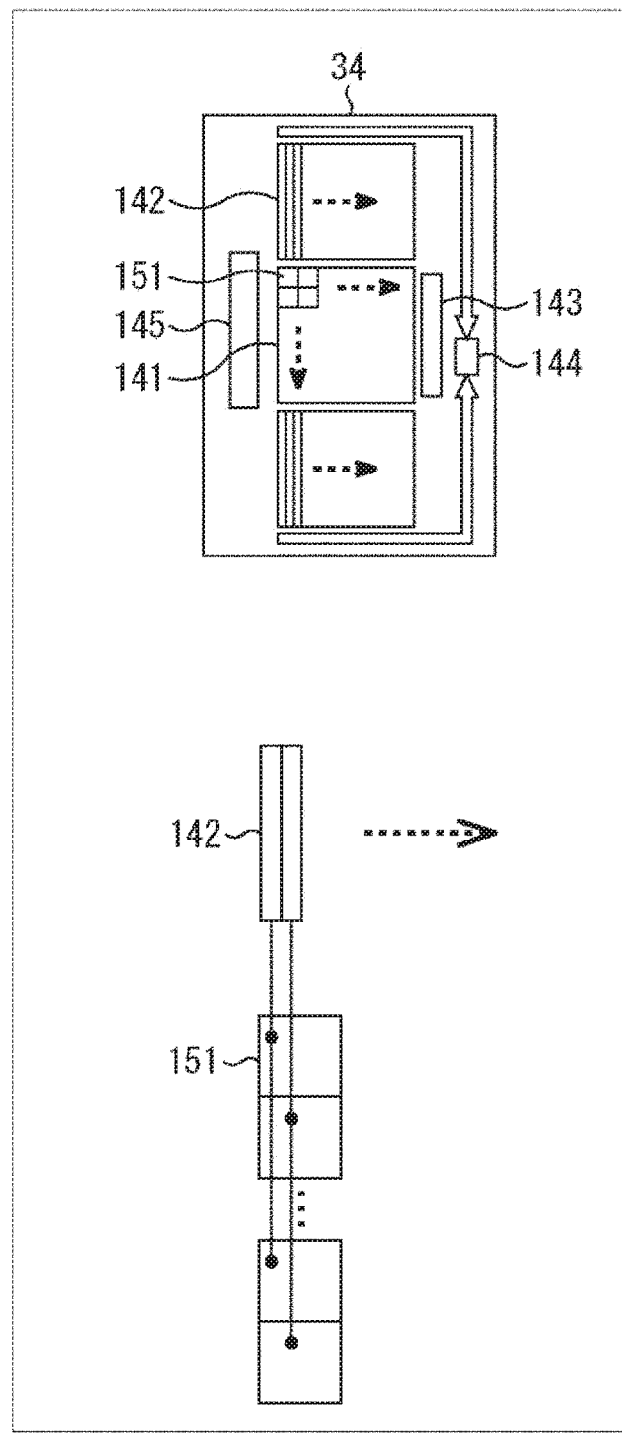
FIG. 10 is a view for illustrating a second configuration example of an imaging element (photodetector) in FIG. 1.

In the example illustrated in FIG. 10, by reducing the number of detection circuits 142, a chip size may be reduced and a chip cost may be suppressed. Also, sensitivity priority and speed priority may be selected depending on an operation mode.

As illustrated in the upper part of FIG. 10, in the photodetector 34, the pixels 151 of 30 μm×30 μm are arranged in an array of 40 pixels×40 pixels in the pixel array 141 and an aperture of 1.2 mm×1.2 mm is realized.

Fluorescence 74 and the like emitted from an irradiation spot 72 is condensed in the pixel array 141 via a condenser lens (including a filter and the like) 36 to be applied thereto. The detection circuit 142 is a detection circuit of a pixel signal including an AD converter, and 400 detection circuits are arranged in columns at a pitch of 3 μm. That is, 10 columns of detection circuits 142 are arranged for one column of pixels 151.

As illustrated in the lower part of FIG. 10, each detection circuit 142 is connected to two pixels 151 depending on arrangement. That is, the 400 detection circuits 142 are connected on a one-to-two basis to the pixels of 40 columns×20 rows corresponding to an upper half of the pixel array 141.

Furthermore, similar 400 detection circuits 142 are arranged also in a lower side, and they are connected on a one-to-two basis to the pixels of 40 columns×20 rows corresponding to a lower half of the pixel array 141.

The circuit configuration of the pixel 151 is similar to that illustrated in FIG. 3, but two pixels sharing one detection circuit 142 are herein alternatively connected to a vertical signal line 124 by a selection transistor 115.

Accumulation signals sequentially read out from the pixels 151 are subjected to digital conversion by the AD converter of the detection circuit 142 and are sequentially output via an output circuit 144. Each pixel is driven by a drive circuit 143, and a drive timing thereof and drive timings of the detection circuit 142 and the output circuit 144 are controlled by a logic circuit 145.

<First Operation Example of Imaging Element in FIG. 10>

Figure 11:
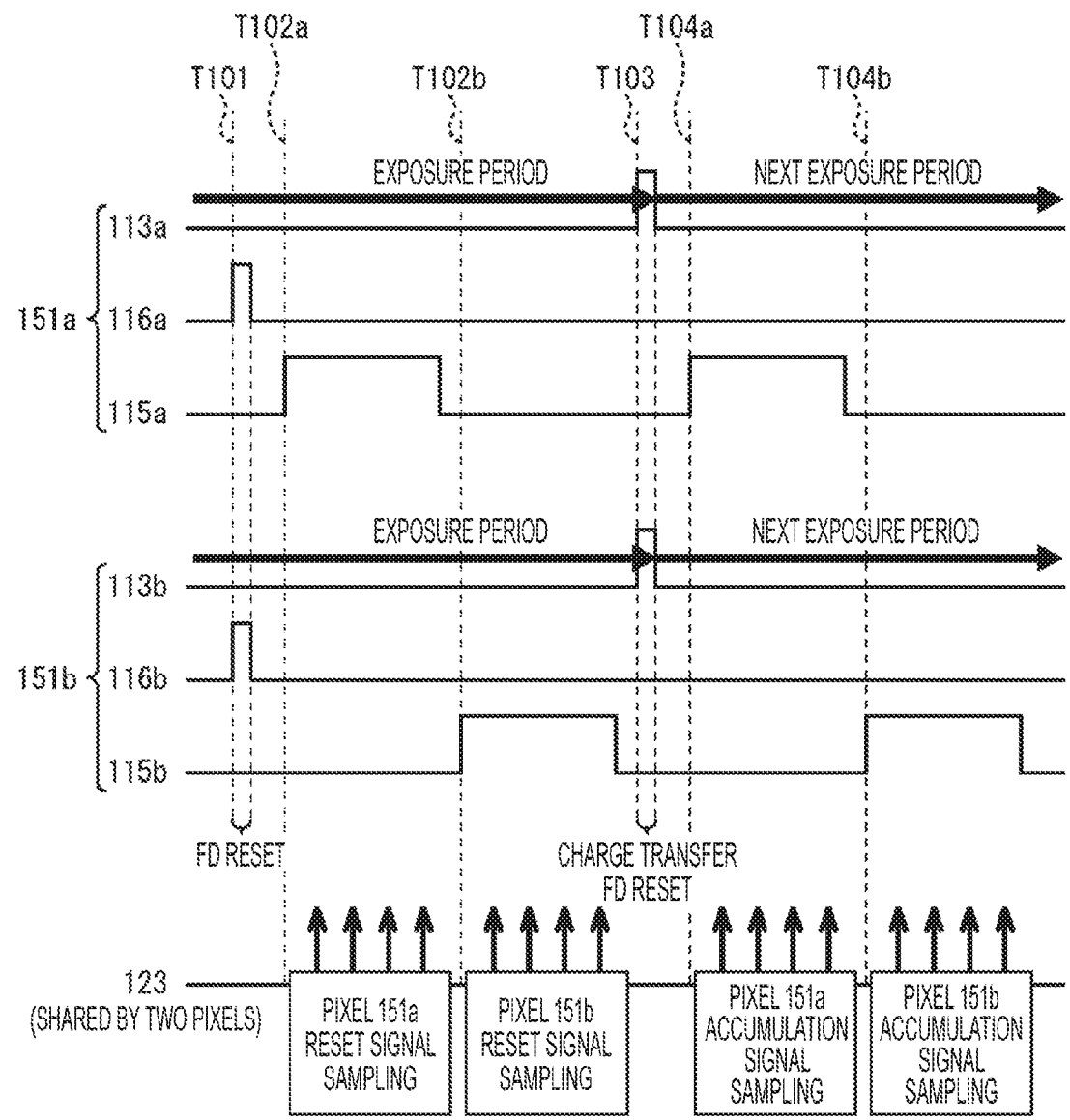
FIG. 11 is a timing chart for illustrating operation of a pixel circuit in FIG. 10.

Next, a first operation example of the pixel circuit in the imaging element in FIG. 10 is described with reference to a timing chart in FIG. 11.

Meanwhile, although the operation of each pixel conforms to that in the example in FIG. 5, it is assumed that one detection circuit 123 is shared by two pixels 151a and 151b, and sampling is sequentially performed for each pixel.

That is, at timing T101, FD reset is performed simultaneously in all the pixels.

First, at timing T102a, a selection transistor 115a of the pixel 151a is turned on, and a reset signal thereof is sampled to be AD converted.

Next, at timing T102b, a selection transistor 115b of the pixel 151b is turned on, and a reset signal thereof is sampled to be AD converted.

Furthermore, at timing T103, transfer of accumulated charges is performed, and unit accumulation is simultaneously completed for all the pixels.

At timing T104a, the selection transistor 115a of the pixel 151a is turned on, and the accumulation signal thereof is sampled to be AD converted.

Next, at timing T104b, the selection transistor 115b of the pixel 151b is turned on, and the accumulation reset signal thereof is sampled to be AD converted.

Then, for each pixel, a difference between the accumulation signal and the reset signal is obtained and is stored in a register as a net accumulation signal to be output.

In this embodiment, since the detection circuit 142 is shared by two pixels, samplings of two pixels are serially performed in one accumulation cycle. Therefore, required time is doubled.

Meanwhile, even in such a configuration, in a case where high-speed measurement is required, for example, if only one pixel out of two pixels is always selected, the accumulation cycle is shortened to ½ and it becomes equivalent to a case where the detection circuit 142 is not shared.

In the lower part of FIG. 10, assuming that 10 columns of detection circuits 142 are arranged at a pitch of 3 μm in each pixel column of a width of 30 μm, the connections between the pixels 151 and the detection circuits 142 are repeated in units of 10 rows. For example, only the pixels of the lower 10 rows among upper and lower 20 rows are always connected to the detection circuits 142 to be used.

Assuming that the upper 10 rows are always connected to be used similarly as for the lower 20 rows of the photodetector 34 in the upper part of FIG. 10, only the pixels of the 20 rows at the center of the pixel array 141 perform photodetection.

When an entire pixel array 141 is irradiated with the detection light, only half of the pixels are used, so that the sensitivity becomes ½. However, deterioration in sensitivity is alleviated by further narrowing condensed light toward the center of a light receiving surface by modifying the lens or the like.

In such a configuration, the light receiving surface may be flexibly enlarged by increasing the number of pixels sharing the detection circuit 142. For example, an application is expected such as responding to high-speed requirements such as a flow cytometer 11 by narrowing the number of pixels to be used while using the same chip for radiation counting and the like to be described later.

<Configuration Example of Flow Cytometer Using Photodetector Using Only Pixels of Central 20 Rows of Pixel Array>

Therefore, a configuration example of the flow cytometer using the photodetector which uses only the pixels of 20 rows at the center of the pixel array is described with reference to FIG. 12. Meanwhile, although FIG. 1 illustrates a cross-sectional view of a flow cell 31, FIG. 12 is an external perspective view.

Figure 12:
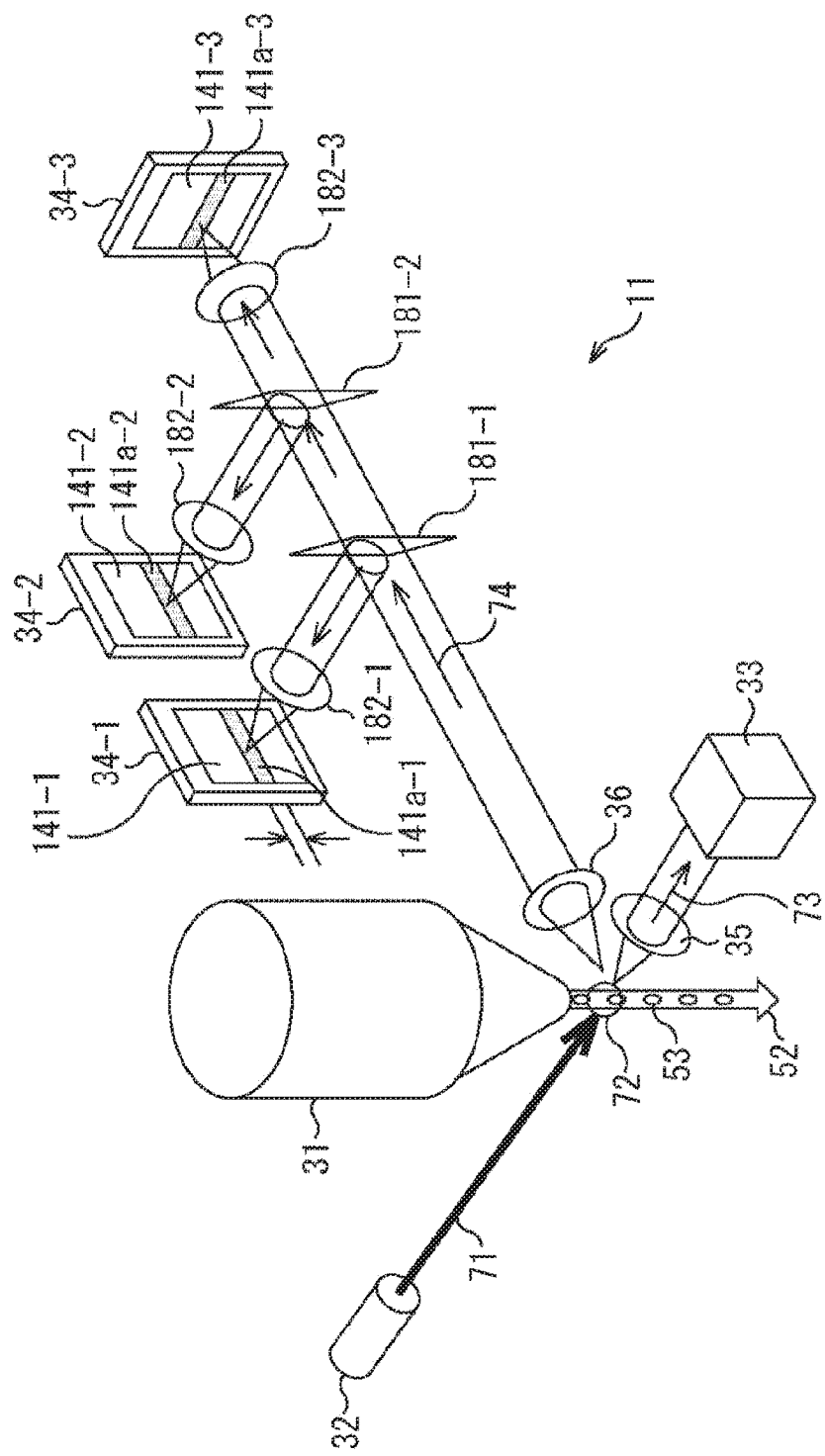
FIG. 12 is a view for illustrating a configuration example of the flow cytometer using the pixel circuit in FIG. 10.

That is, the flow cytometer 11 in FIG. 12 is different from the flow cytometer 11 in FIG. 1 in that three photodetectors 34 are provided, and half mirrors 181-1 and 181-2 and condenser lenses 182-1 to 182-3 are provided correspondingly.

The half mirror 181-1 reflects a part of parallel light of the fluorescence 74 on the condenser lens 182-1 provided on a preceding stage of a photodetector 34-1 and allows a remaining part of the parallel light of the fluorescence 74 to be incident on the half mirror 181-2. The condenser lens 182-1 irradiates a range 141a-1 of 20 rows at the center of a pixel array 141-1 of the photodetector 34-1 with a part of the parallel light of the fluorescence 74.

The half mirror 181-2 reflects a part of the parallel light of the fluorescence 74 on the condenser lens 182-2 provided on a preceding stage of the photodetector 34-2 and allows a remaining part of the parallel light of the fluorescence 74 to be incident on the condenser lens 182-3 provided on a preceding stage of the photodetector 34-3. The condenser lens 182-2 irradiates a range 141a-2 of 20 rows at the center of a pixel array 141-2 of the photodetector 34-2 with the remaining part of the parallel light of the fluorescence 74.

The condenser lens 182-3 irradiates a range 141a-3 of 20 rows at the center of a pixel array 141-3 of the photodetector 34-3 with the remaining part of the parallel light of the fluorescence 74.

With such a configuration, the flow cytometer 11 in FIG. 12 operates as follows.

That is, a specimen 53 such as cells flows down in a line on a sample flow 52 in the flow cell 31. A laser beam 71 is applied thereto. When the specimen 53 passes through the irradiation spot 72 of the laser beam 71, scattered light and fluorescence excited from a fluorescent marker or the like are generated. Forward scattered light 73 having a large light amount is received by a photo diode 33, a size of the specimen is detected, a timing of passage of the specimen is obtained, and an event signal thereof is generated.

On the other hand, side scattered light or the fluorescence 74 emitted from the fluorescent marker attached to the specimen become weak pulsed light and are detected by using the photodetector 34.

The fluorescence (weak light) 74 becomes parallel light by the condenser lens 36, further dispersed through the half mirrors 181-1 and 181-2, and applied to a plurality of photodetectors 34-1 to 34-3. Each of the photodetectors 34-1 to 34-3 detects fluorescence of different wavelengths via a filter or the like not illustrated.

Furthermore, the condenser lenses 182-1 to 182-3 are installed on the preceding stages of the photodetectors 34-1 to 34-3, respectively, to narrow irradiated areas to central areas 141a-1 to 141a-3 of the pixel arrays 141-1 to 141-3 in the photodetectors 34-1 to 34-3, respectively.

The photodetectors 34-1 to 34-3 selectively drive only the ranges 141a-1 to 141a-3 of the 20 rows at the center of the pixel arrays 141-1 to 141-3, respectively, thereby realizing high-speed driving, and obtaining excellent sensitivity by condensing.

Meanwhile, in general, the photodetector 34 in the present disclosure realizes the high-speed driving by reducing a size of a light receiving unit or narrowing a driving area in the light receiving unit. That is, the high-speed driving is realized by narrowing an effective light-receiving area, so that installation of such light condensing means is effective for compatibility with sensitivity.

That is, the fluorescence 74 including the weak pulsed light becomes the parallel light by the condenser lens 36, and then further condensed by the condenser lenses 182-1 to 182-3, desirably condensed such that either a width or a length of the light irradiated area is, for example, 5 mm or less, more desirably 2 mm or less.

3. Third Embodiment

<Third Configuration Example of Imaging Element>

Next, a third configuration example in which detection circuits correspond to pixel circuits on a many-to-one basis is described with reference to FIG. 13. Herein, a third configuration example of an imaging element 34 is illustrated in an upper part of FIG. 13, and a configuration example of a pixel 361 in a pixel array 221 and detection circuits 223 and 227 in the imaging element 34 in the upper part of FIG. 13 is illustrated in a lower part of FIG. 13.

Figure 13:
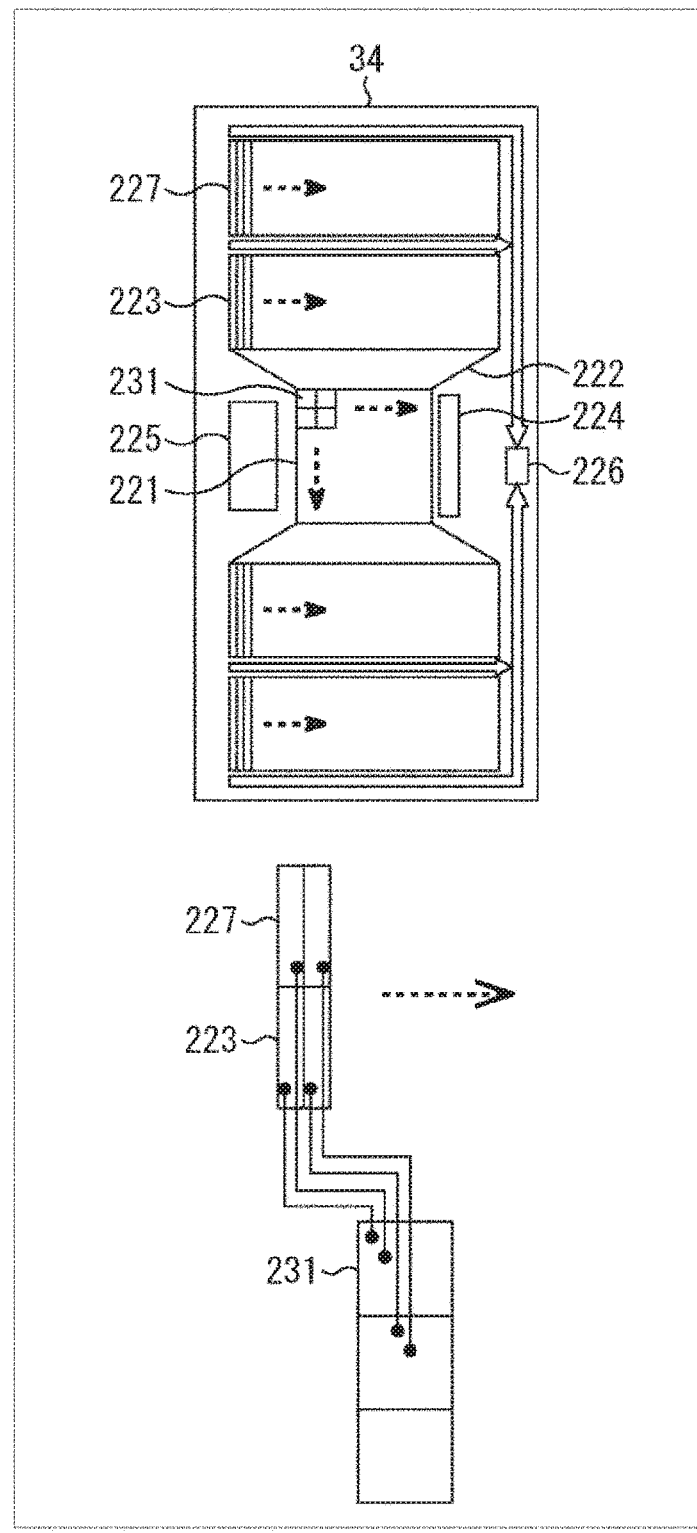
FIG. 13 is a view for illustrating a third configuration example of the imaging element (photodetector) in FIG. 1.

The imaging element 34 in FIG. 13 is provided with the pixel array 221, a connection unit 222, the detection circuit 223, a drive circuit 224, a logic circuit 225, and an output circuit 226.

In the imaging element (photodetector) 34 in the upper part of FIG. 13, the pixels 361 of 30 μm×30 μm are arranged in an array of 40 pixels×40 pixels in the pixel array 221 and an aperture of 1.2 mm×1.2 mm is realized.

Fluorescence 74 and the like emitted from an irradiation spot 72 is condensed in the pixel array 221 via a condenser lens (including a filter and the like) 36 to be applied thereto. The detection circuits 223 and 227 are detection circuits of a pixel signal including an AD converter, and 800 detection circuits are arranged in columns at a pitch of 3 μm in two stages.

That is, 20 columns of detection circuits 223 and 20 columns of detection circuit 227 are arranged for one column of pixels 361. As illustrated in the lower part of FIG. 13, the detection circuits 223 and 227 forming a pair are connected to a single pixel 361. That is, 1,600 detection circuits 223 and 227 are connected to the pixels 361 of 40 columns×20 rows corresponding to an upper half of the pixel array 221 on a two-to-one basis.

Furthermore, similar 1,600 detection circuits 223 and 227 are arranged also in a lower half of the pixel array 221, and they are connected to the pixels 361 of 40 columns×20 rows corresponding to the lower half of the pixel array 221 on a two-to-one basis.

Meanwhile, since many wires pass through the pixel 361 for connection to the detection circuits 223 and 227, in order to prevent deterioration in aperture ratio of the pixel by them, the pixel 361 may be of a rear surface irradiation type.

<Configuration Example of Pixel Circuit of Imaging Element in FIG. 13>

Next, a configuration example of a pixel circuit of the pixel 361 of the imaging element 34 in FIG. 13 is described with reference to FIG. 14.

In the pixel 361, two systems of detection nodes 117-1 and 117-2 are connected to one photo diode 111. Meanwhile, in FIG. 14, the same configuration as that in FIG. 3 is assigned with the same reference sign with "-1" and "-2" attached to first and second systems, respectively, out of the two systems.

Charges accumulated in the photo diode 111 are completely transferred to the detection nodes 117-1 and 117-2 via transfer transistor 113-1 and 113-2, respectively.

Also, the charges in the detection node 117-1 are extracted to a power supply through a reset transistor 116-1 to be reset, and the charges in the detection node 117-2 are extracted to the power supply through a reset transistor 116-2 to be reset.

The accumulated charges transferred to the detection nodes 117-1 and 117-2 are amplified by amplification transistors 114-1 and 114-2, and are individually output to the detection circuits 123-1 and 123-2, respectively. The detection circuit 123-1 and a constant current circuit 122-1 are a part of the detection circuit 223, and the detection circuit 123-2 and a constant current circuit 122-2 are a part of the detection circuit 227.

Figure 14:
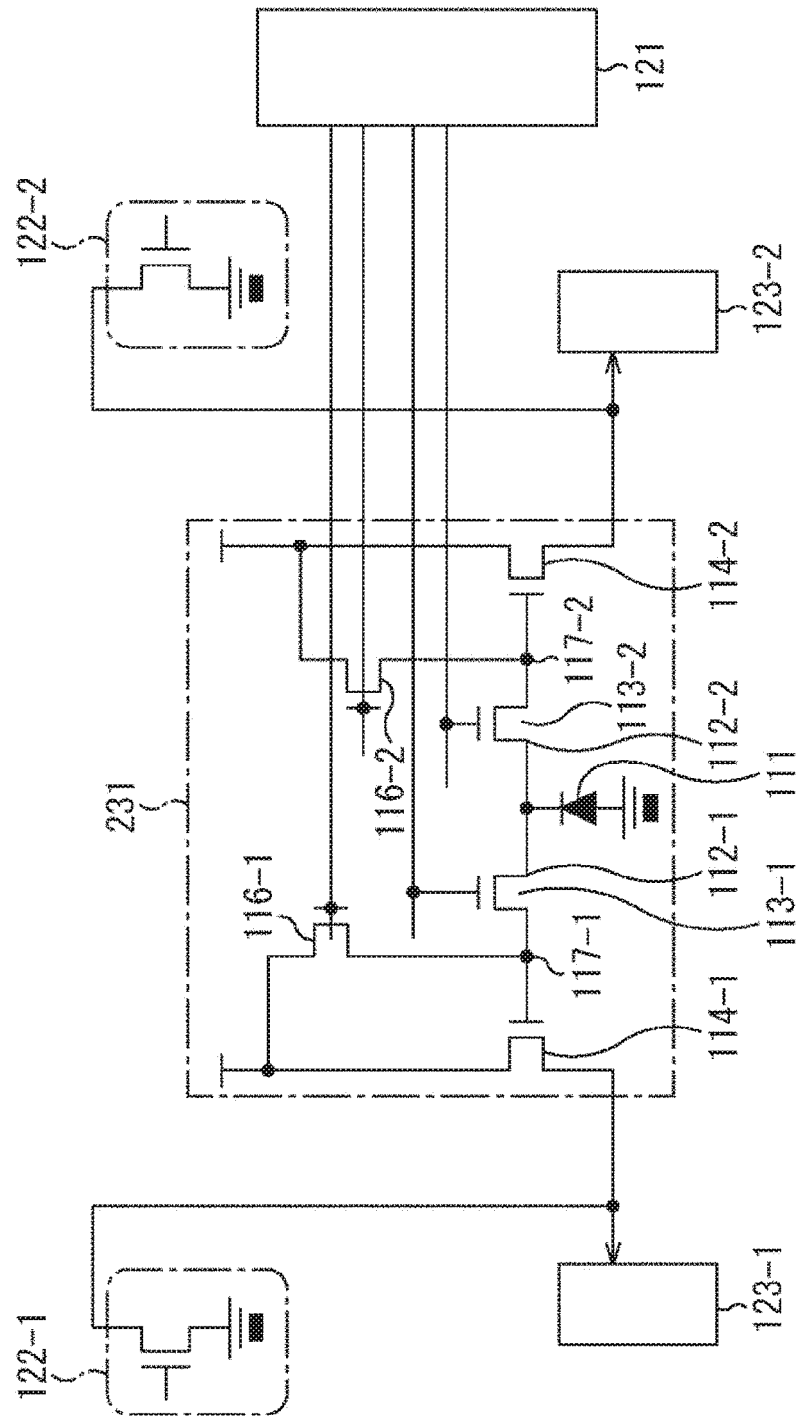
FIG. 14 is a view for illustrating a first configuration example of a pixel (pixel circuit) of the imaging element in FIG. 13.

<Operation Example of Pixel Circuit in FIG. 14>

Next, an operation example of the pixel circuit in FIG. 14 is described with reference to a timing chart in FIG. 15.

Photoelectric conversion charges accumulated in the photo diode 111 are alternately transferred to the detection node 117-1 via the transfer transistor 113-1 and to the detection node 117-2 via the transfer transistor 113-2. The photo diode 111 immediately starts next accumulation when a unit accumulation period ends together with accumulated charge transfer.

At timing T131, the accumulated charges of the photo diode 111 are transferred to the detection node 117-2, and new accumulation is started in the photo diode 111. On the other hand, in the detection node 117-1, the reset transistor 116-1 is turned on and off, the charges of the detection node 117-1 are discharged, and FD reset is executed.

At timing T132, an accumulation signal reflecting the accumulated charges of the detection node 117-2 is sampled by the detection circuit 123-2. Also, in parallel thereto, a reset signal reflecting a reset state of the detection node 117-1 is sampled by the detection circuit 123-1.

At timing T133, the accumulated charges of the photo diode 111 are transferred to the detection node 117-1, and new accumulation is started in the photo diode 111. On the other hand, in the detection node 117-2, the reset transistor 116-2 is turned on and off, the charges of the detection node 117-2 are discharged, and the FD reset is executed.

At timing T134, an accumulation signal reflecting the accumulated charges of the detection node 117-1 is sampled by the detection circuit 123-1. Also, in parallel thereto, a reset signal reflecting a reset state of the detection node 117-2 is sampled by the detection circuit 123-2.

By repeating such accumulation and detection cycles, one of the sampling of the reset signal and the sampling of the accumulation signal defines the accumulation cycle. Therefore, in the cycle in FIG. 15, the accumulation cycle is shortened to about half of a normal cycle illustrated in FIG. 5, and event processing capacity is doubled. Also, the operation is similar to a high-speed cycle by alternate accumulation illustrated in FIG. 9, but there is no pixel or photo diode in a dead state, so that sensitivity is not deteriorated.

<Configuration Example of Pixel Circuit of Imaging Element in FIG. 13>

In the description above, an example in which two detection nodes 117 are provided for one photo diode 111 is described; however, the number of detection nodes 117 may be further increased; for example, four detection nodes 117 may be provided for one photo diode 111.

Figure 16:
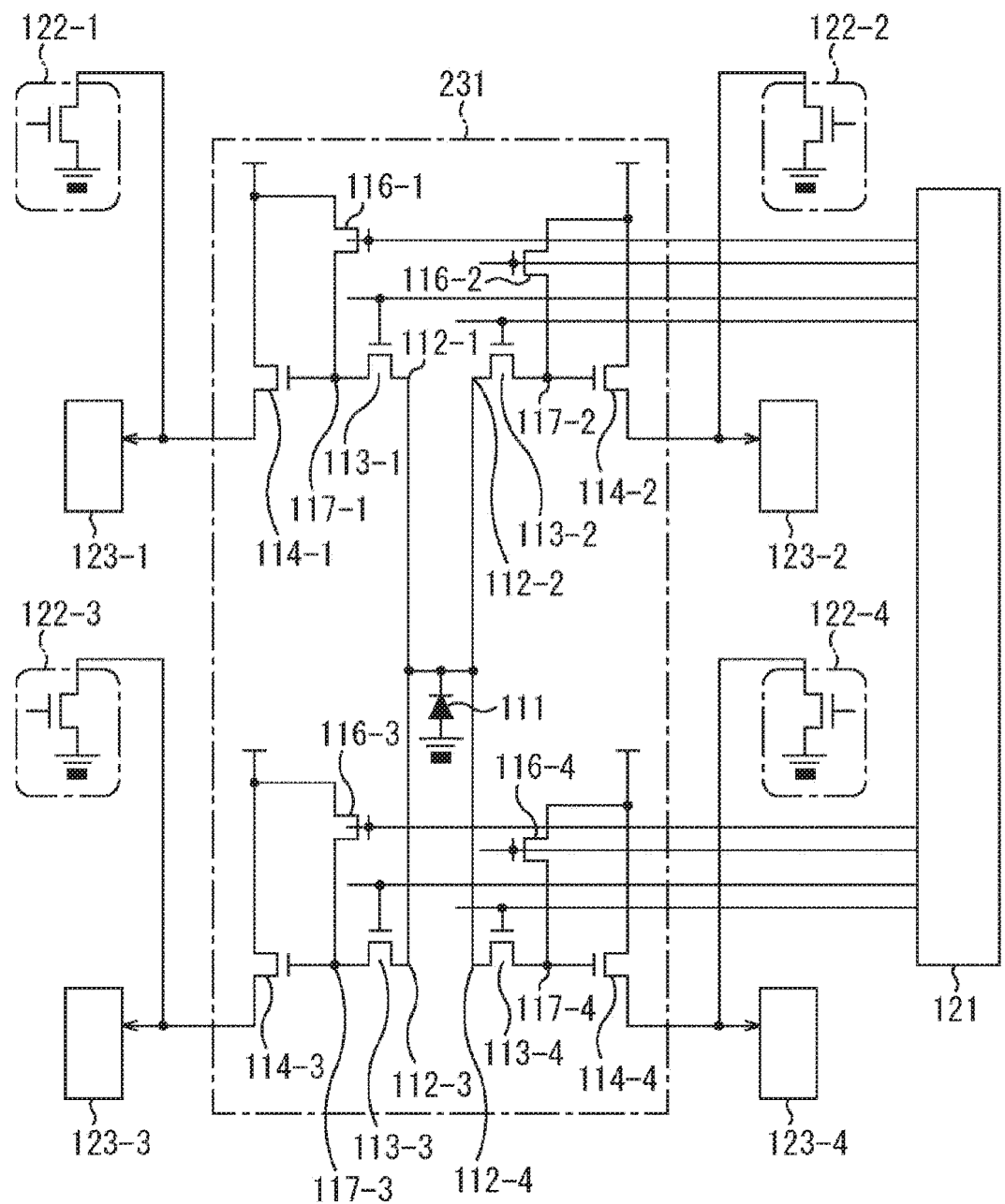
FIG. 16 is a view for illustrating a second configuration example of a pixel (pixel circuit) of an imaging element in FIG. 15.

FIG. 16 illustrates an example in which correspondence between a detection circuit (corresponding to the detection circuits 223 and 227) and the pixels 361 is further set to one-to-four, four systems of detection nodes 117-1 to 117-4 are connected to the photo diode of the pixel, and an independent output is output to an independent detection circuit.

That is, in the pixel 361, the four systems of detection nodes 117-1 and 117-4 are connected to one photo diode 111. Meanwhile, in FIG. 16, the same configuration as that in FIG. 3 is assigned with the same reference sign with "-1" to "-4" attached to first to fourth systems, respectively, out of the four systems.

The charges accumulated in the photo diode 111 are completely transferred to detection nodes 117-1, 117-2, 117-3, and 117-4 via the transfer transistors 113-1, 113-2, 113-3, and 113-4, respectively.

In addition, the charges of the detection node 117-1 are extracted to the power supply through the reset transistor 116-1 to be reset, the charges of the detection node 117-2 are extracted to the power supply through the reset transistor 116-2 to be reset, the charges of the detection node 117-3 are extracted to the power supply through a reset transistor 116-3 to be reset, and the charges of the detection node 117-4 are extracted to the power supply through a reset transistor 116-4 to be reset.

The accumulated charges transferred to the detection nodes 117-1 to 117-4 are amplified by the amplification transistors 114-1 to 114-4, and are individually output to the detection circuits 123-1 to 123-4, respectively.

Figure 17:
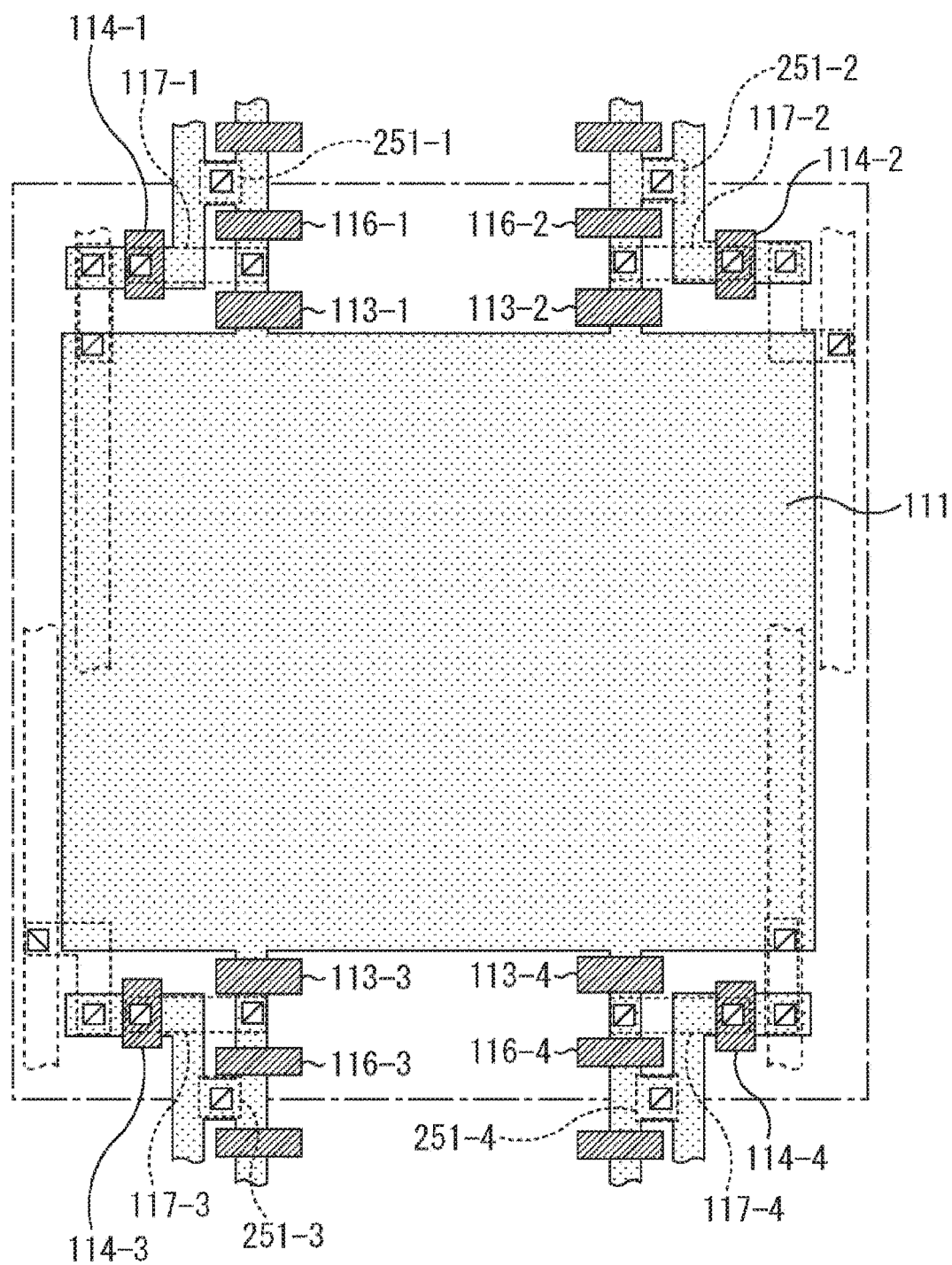
FIG. 17 is a view illustrating an arrangement example of the pixel (pixel circuit) of the imaging element in FIG. 15.

Also, as illustrated in FIG. 17, the detection nodes 117-1 to 117-4, the transfer transistor 113, the amplification transistor 114, the reset transistor 116, and the constant current circuit 122 are arranged on ends of respective corners of the rectangular photo diode 111 for each system.

That is, in an upper left part of the photo diode 111 in FIG. 17, connection wiring to the transfer transistor 113-1, the amplification transistor 114-1, the reset transistor 116-1, and a power supply 251-1 corresponding to the detection node 117-1 is provided.

In addition, in an upper right part of the photo diode 111 in FIG. 17, connection wiring to the transfer transistor 113-2, the amplification transistor 114-2, the reset transistor 116-2, and a power supply 251-2 corresponding to the detection node 117-2 is provided.

Further, in a lower left part of the photo diode 111 in FIG. 17, connection wiring to the transfer transistor 113-3, the amplification transistor 114-3, the reset transistor 116-3, and a power supply 251-3 corresponding to the detection node 117-3 is provided.

In addition, in a lower right part of the photo diode 111 in FIG. 17, connection wiring to the transfer transistor 113-4, the amplification transistor 114-4, the reset transistor 116-4, and a power supply 251-4 corresponding to the detection node 117-4 is provided.

<Operation Example of Pixel Circuit in FIG. 16>

Figure 18:
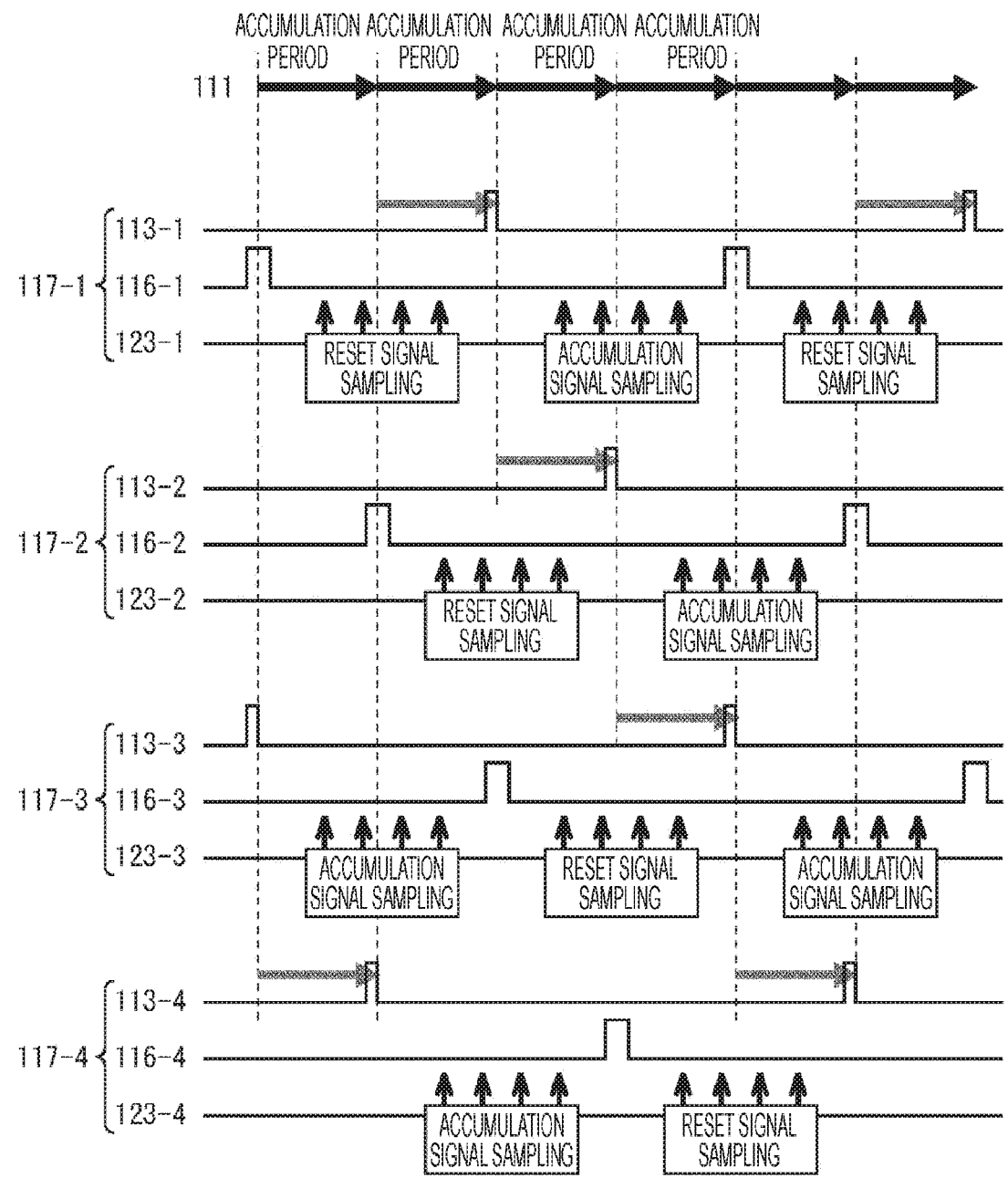
FIG. 18 is a timing chart for illustrating the operation of the pixel circuit in FIG. 15.

Next, the photoelectric conversion charges accumulated in the photo diode are cyclically transferred to the detection nodes of the detection nodes 117-1 to 117-4, sampled, and AD converted with reference to a timing chart in FIG. 18.

Even if 10 µs is required for one cycle of detection including the sampling of the reset signal and the sampling of the storage signal, the unit accumulation period in the photo diode 111 is shortened to ¼ thereof, and it is possible to independently derive an amount of incident light in each accumulation cycle.

Therefore, event detection is possible in a cycle of 2.5 µs, and 400,000 events may be processed per second.

Meanwhile, parallel processing of such detection may be realized only by adopting the present disclosure in which the pixel itself has an integration function and the AD converter is connected to the pixel output in an on-chip manner.

That is, in a conventional photodetector such as a photomultiplier tube which directly multiplies a transient response of the received light amount to output, it is required to continuously perform the AD conversion a plurality of times and derive an entire amount of light which changes over time, so that performance of an external AD converter limits a processing speed.

On the other hand, although a CCD has the integration function in the pixel, it takes time for CCD transfer of the pixel signals, and an output thereof is AD converted serially for each pixel in general, so that it is extremely slow.

As described above, the flow cytometer of the present disclosure makes it possible to reduce the size and weight of the device configuration including the photodetector and to improve the precision and speed of weak pulsed light detection, so that it becomes possible to increase throughput.

4. Fourth Embodiment

<Application Example to Radiation Counting Device>

Although the flow cytometer is described so far, since the photodetector of the present disclosure has a characteristic of detecting weak light pulses at high speed, this may be used for various optical measuring instruments applying light pulses.

Figure 19:
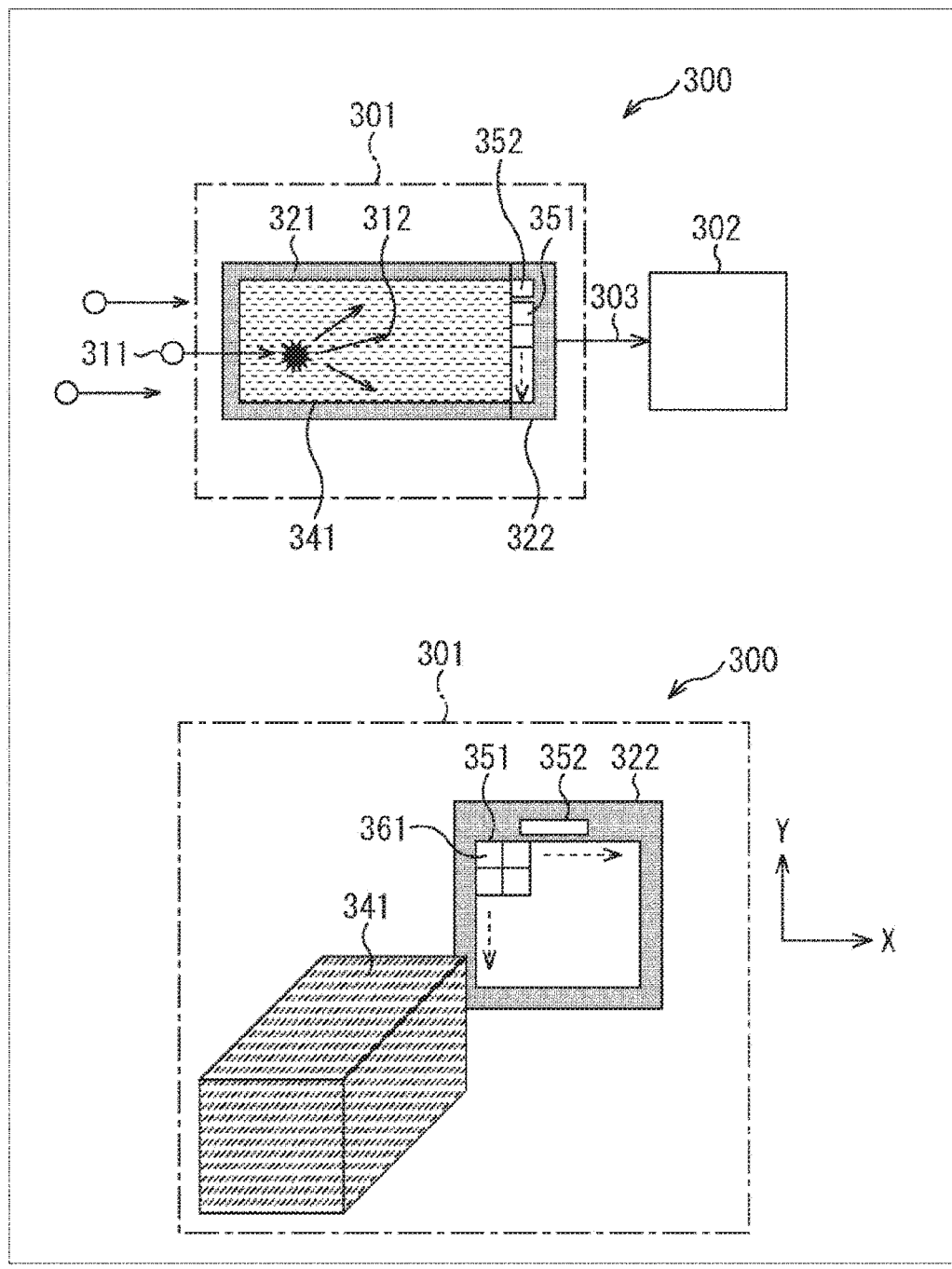
FIG. 19 is a configuration example of a radiation counting device to which the imaging element (photodetector) of the present disclosure is applied.
Figure 20:
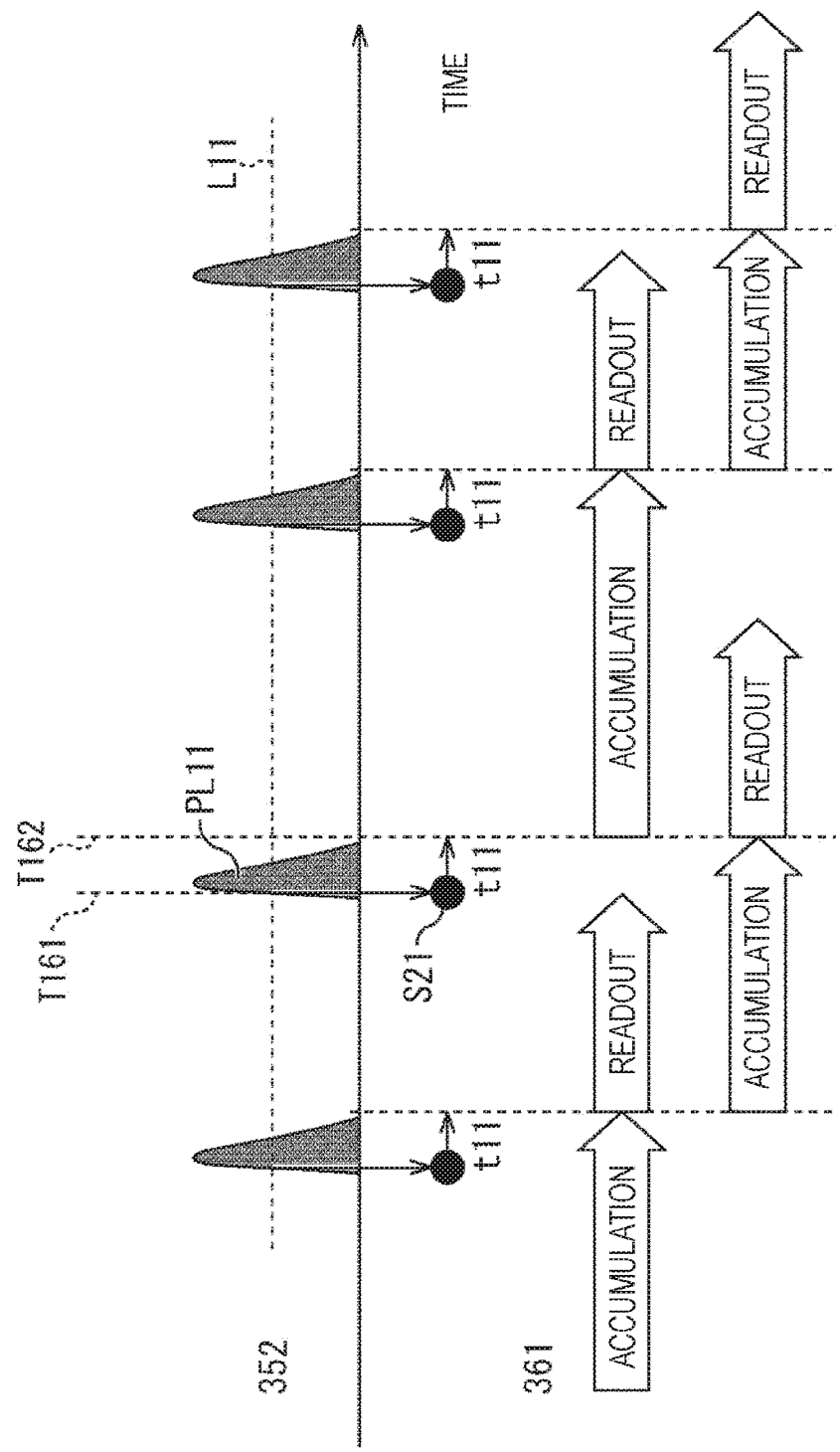
FIG. 20 is a timing chart for illustrating operation of the radiation counting device in FIG. 19.

Then, a radiation counting device is next described as an example of the application thereof with reference to FIG. 19. Herein, an upper part of FIG. 19 is a cross-sectional view of the radiation counting device using an imaging element of the present disclosure. Also, a lower part of FIG. 19 is a perspective view of the radiation counting device.

A radiation counting device 300 in FIG. 19 is provided with a light receiving unit 301 and a data processing unit 302. In addition, the light receiving unit 301 is provided with a scintillator 341, a partition wall 321, and a photodetector 322. Furthermore, the photodetector 322 corresponds to the photodetector 34 described above.

The scintillator 341 including for example, $Lu_2SiO_5:Ce$ (LSO) is formed into a columnar shape of 2 mm square, and generates pulses of visible light when a radiation is incident thereon.

The partition wall 321 covers the scintillator 341 and blocks the visible light. However, only a surface facing the photodetector 322 is opened in this partition wall 321. In addition, a reflective substance (for example, aluminum) which reflects light desirably forms the partition wall 321. As a result, most of photons generated by the scintillator 341 are incident on the photodetector 322.

The photodetector 322 detects light and generates a digital signal. This photodetector 322 includes a pixel array 351 opposed to the scintillator 341, and a plurality of pixels (pixel circuits) 361 (for example, 100 pixels×100 pixels) is provided in a two-dimensional lattice form in the pixel array 351. Furthermore, a photodetection circuit 352 for detecting light incidence as an event is inserted. The photodetector 322 supplies the generated digital signal to the data processing unit 302 via a signal line 303.

The data processing unit 302 processes the digital signals and performs radiation counting. Also, the data processing unit 302 evaluates a light amount of a light emission pulse and determines energy of the radiation.

Meanwhile, a method of inserting the photodetection circuit 352 is optional and, for example, this may be inserted into the pixel array 351; however, it is desirable that a total occupied area is not larger than half of the pixel array 351, preferably not larger than ¼ so that the pixel (pixel circuit) 361 used for the light amount measurement may receive a lot of light.

Also, it is desirable that the scintillator 341 and the photodetector 322 are adhered by an optical adhesive having an appropriate refractive index, or a light guide including fiber glass or the like may be inserted between them.

Furthermore, by tiling the scintillator 341 and the photodetector 322 in an X-Y direction, it is possible to form the radiation counting device 300 having spatial resolution such as a positron emission tomography (PET) and gamma camera.

By the way, in the radiation counting device 300, for example, weak light emission pulses including thousands of photons 312, for example, generated by photoelectronic absorption of one radiation 311 to the scintillator 341 are measured. In the radiation counting device 300 to which the present disclosure is applied, this is received by an array including a plurality of pixels 361, and each pixel generates an independent output according to a light receiving state.

The pixel 361 includes the circuit configuration already described with reference to FIG. 3, and accumulates charges generated by an internal photoelectric conversion element in the pixel. In addition, the pixel 361 may accumulate a plurality of charges corresponding to the incidence of a plurality of photons. An output signal corresponding to the accumulated charges is read out at a desired timing as necessary and converted into a digital value having a gradation larger than one bit by an AD converter incorporated in the photodetector 322. Furthermore, the pixel 361 has a function of resetting the interior to a dark state in which no photon is incident.

On the other hand, the photodetection circuit 352 is a circuit which detects significant light incidence as an event including, for example, a multiplier type photo diode such as an APD, and is constantly monitored during a detection period. Light emission of a scintillation pulse is detected by the photodetector 322, and a timing of the radiation incidence is obtained.

Figure 15:
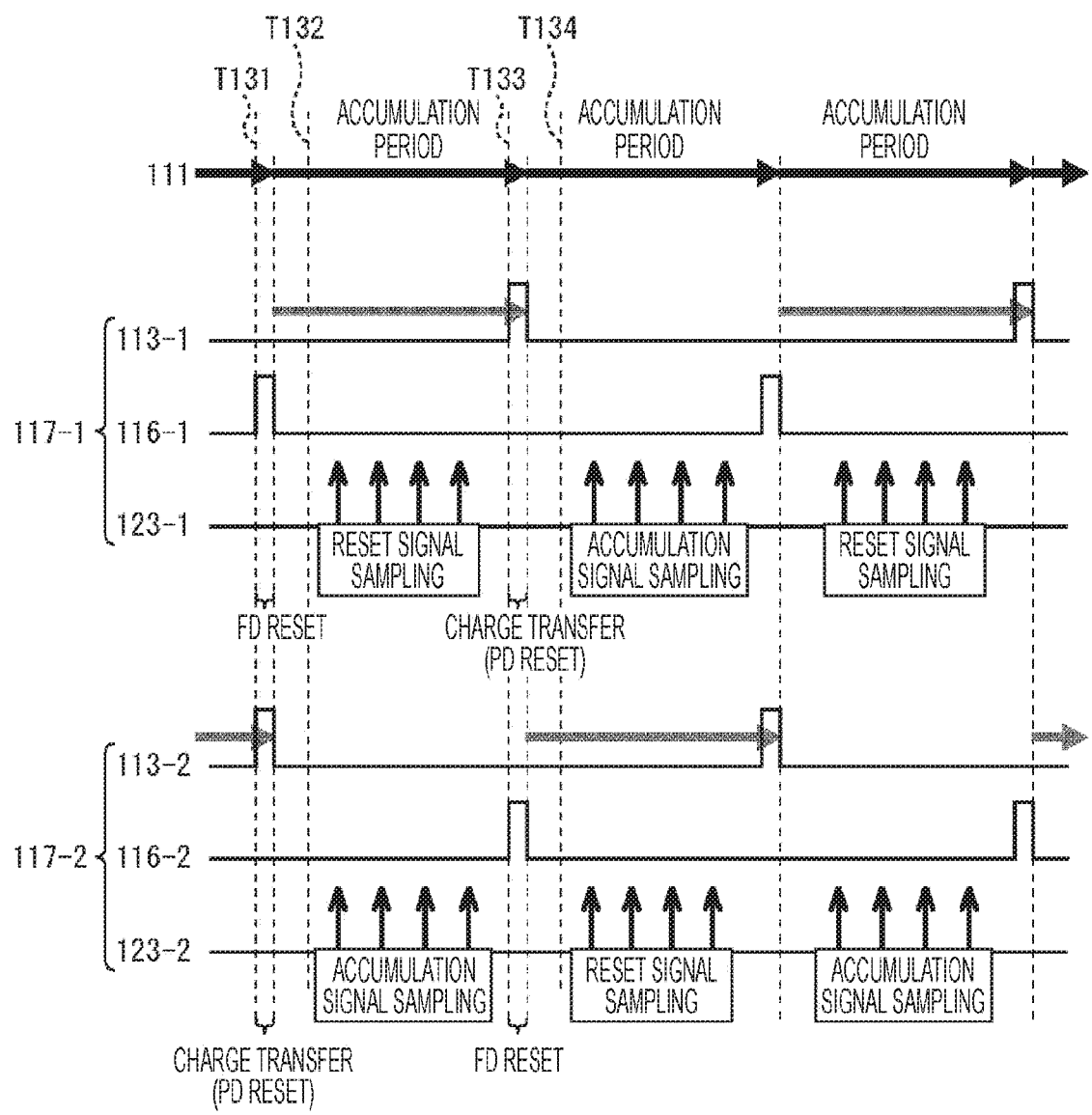
FIG. 15 is a timing chart for illustrating operation of the pixel circuit in FIG. 14.

<Operation Example of Scintillation Light Detection in Radiation Counting Device in FIG. 15>

Next, an operation example of scintillation light detection in the radiation counting device 300 in FIG. 15 is described with reference to a timing chart in FIG. 16.

As the radiation 311 is incident on the scintillator 341, scintillation light having a pulse waveform PL11 is incident on the photodetector 322. A part thereof is incident on the photodetection circuit 352, and the other part is incident on the pixel 361 for light amount detection.

Thereby, at timing T161, the photodetection circuit 352 obtains the light emission timing of the pulse from a comparison between a detection signal of the received scintillation pulse and a threshold L11, and generates an internal event signal S21.

Herein, accumulation is completed and the output is read out in the pixel 361 in synchronization with the event signal of passage of the specimen 53. Access sequence of the readout is a global shutter with almost no dead period according to FIG. 5. That is, the accumulation is started and finished simultaneously for all the pixels. At that time, in-pixel transfer is performed in synchronization with the event signal S21 indicating the passage of the specimen 53, and the accumulation period of all the pixels is finished at the same time. Then, the readout of the accumulation signal is started. Furthermore, the next accumulation period simultaneously starts in all the pixels.

That is, the photodetector 322 completes the accumulation in the pixel 361 at timing T162 after a certain delay t11 in consideration of a fluorescence lifetime of the scintillation light from the acquisition of the event signal S21, and starts reading the accumulation signal. Furthermore, the next accumulation is started.

The accumulation signal is read out together with acquisition of the difference between an AD converted value of the accumulation signal and an AD converted value of the reset signal already obtained, and the net accumulation signal obtained by canceling the kTC noise and the like is derived by this. Furthermore, subsequent to this, the reset signal is obtained and the AD conversion is performed in the next cycle, and the next accumulation is completed and the readout become possible when they are completed.

A total value of the net accumulation signals output from a plurality of pixels in each event processing corresponds to a total amount of photons received by the photodetector 322 for each pulse.

Meanwhile, in the examples so far, the detection circuit including the AD converter is arranged on the same semiconductor substrate as the pixel, but it is possible to arrange the same on a different semiconductor substrate and stack the same on the pixel via an insulating layer by a bonding technique or the like.

In this case, the pixel output and the detection circuit are connected via, for example, metal embedded in a via or the like penetrating the insulating layer. They are integrated with the semiconductor substrate forming the pixel to form a single semiconductor chip. That is, such on-chip mounting of the AD converter in the present disclosure includes such a substrate stacking configuration. Also, an amplifier element or the like may be further inserted between the pixel output and the AD converter.

Meanwhile, the present disclosure may also have the following configuration.

<1> An optical measuring instrument provided with:
a light pulse generation unit which generates a light pulse of intensity according to a state of an object to be measured;
a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels; and
a control unit which controls an accumulation timing of the charges of the plurality of pixels in the photodetection unit in synchronization with incidence of the light pulse.

<2> The optical measuring instrument according to <1>,
in which the control unit controls the photodetection unit to allow the plurality of pixels to simultaneously complete the accumulation of the charges at a timing at which the incidence of the light pulse starts or a timing after elapse of predetermined time from a timing at which the incidence of the light pulse is completed and output the pixel signals, and to detect the light amount of the light pulse based on the pixel signals.

<3> The optical measuring instrument according to <1> or <2>,
in which the plurality of pixels is divided into a plurality of pixel groups, and
the control unit controls the photodetection unit to allow each of the pixel groups to simultaneously complete the accumulation of the charges at a timing at which the incidence of the light pulse starts or at a timing after elapse of predetermined time from a timing at which the incidence of the light pulse is completed and allow each of the pixel groups to output the pixel signals, and to detect the light amount of the light pulse based on the pixel signals.

<4> The optical measuring instrument according to <3>,
in which the control unit controls the photodetection unit to allow one or the other of the plurality of pixel groups to simultaneously complete the accumulation of the charges at a timing at which the incidence of the light pulse starts or a timing after elapse of predetermined time from a timing at which the incidence of the light pulse is completed and allow the one or the other of the pixel groups to output the pixel signals, and to detect the light amount of the light pulse based on the pixel signals, and alternately changes the one or the other of the pixel groups each time the light pulse is incident.

<5> The optical measuring instrument according to <3>,
in which the control unit controls the photodetection unit to allow the same or different pixel group to simultaneously start new accumulation substantially at the same time as the accumulation of the charges is completed.

<6> The optical measuring instrument according to any one of <1> to <5>,
in which the photodetection unit includes:
a plurality of signal detection units each of which reads out pixel signals of one or more predetermined number of pixels by switching the pixels to convert into digital signals, and
the photodetection unit controls the plurality of signal detection units to read out pixel signals of a part of the predetermined number of pixels to convert into the digital signals, and detects the light amount of the light pulse based on the pixel signals of the part of pixels.

<7> The optical measuring instrument according to <6>,
in which the photodetection unit includes:
a pixel array in which the pixels are arranged in an array, and
controls the plurality of signal detection units to read out pixel signals of a part of pixels in a specific range in the pixel array out of the predetermined number of pixels to convert into the digital signals, and detects the light amount of the light pulse based on the pixel signals of the part of pixels.

<8> The optical measuring instrument according to <7>,
with a plurality of photodetection units provided,
the optical measuring instrument provided with:
a dispersing unit which disperses the light pulse to the plurality of photodetection units; and
a condensing unit which condenses light pulses dispersed to the plurality of photodetection units by the dispersing unit to a specific range in the pixel array in the photodetection unit to apply,
in which the plurality of photodetection units detects the light amount of the light pulse based on the pixel signals of the part of the pixels in an allocated period among divided periods in a period from when the incidence of the light pulse starts to when the incidence is completed.

<9> The optical measuring instrument according to <6>,
in which the signal detection unit is connected to the pixels in an on-chip manner.

<10> The optical measuring instrument according to any one of <1> to <9>,
in which each of the pixels includes a plurality of detection nodes in which the charges subjected to the photoelectric conversion by the photoelectric conversion element are sequentially accumulated for a predetermined period and the accumulated charges after the accumulation is completed are transferred for one photoelectric conversion element, and
the control unit controls the photodetection unit to allow the pixels to simultaneously complete the accumulation of the charges at a timing at which the incidence of the light pulse starts or a timing after elapse of predetermined time from a timing at which the incidence of the light pulse is completed to transfer to any of the plurality of detection nodes and output the pixel signals of the pixels on the basis of the accumulated charges transferred to the detection nodes, and to detect the light amount of the light pulse based on the pixel signals, and periodically switches a detection node to which the accumulated charges are transferred among the plurality of detection nodes each time the light pulse is incident.

<11> The optical measuring instrument according to any one of <1> to <10>, in which the light pulse is fluorescence or scattered light generated when a laser beam is applied to a specimen in a fluid which passes through a flow cell.

<12> The optical measuring instrument according to <11>, in which the photodetection unit detects the fluorescence or scattered light generated when the laser beam is applied to the specimen in the fluid which passes through the flow cell, the light pulse observed in a direction substantially perpendicular to a travel direction of the laser beam.

<13> The optical measuring instrument according to <12>, further provided with:

a front photodetection unit which detects the light pulse generated when the laser beam is applied to the specimen in the fluid which passes through the flow cell in a direction substantially in front of a light source of the laser beam, and the control unit detects a timing at which the incidence of the light pulse starts or a timing at which the incidence is finished according to a level of the light pulse detected by the front photodetection unit.

<14> The optical measuring instrument according to any one of <1> to <13>, in which the light pulse is scintillation light when a radiation is incident on a scintillator.

<15> A flow cytometer provided with:

a light pulse generation unit which generates a light pulse of intensity according to a state of an object to be measured;

a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels; and a control unit which controls an accumulation timing of the charges of the plurality of pixels in the photodetection unit in synchronization with incidence of the light pulse.

<16> A radiation counter provided with:

a light pulse generation unit which generates a light pulse of intensity according to a state of an object to be measured;

a photodetection unit which receives the light pulse by a plurality of pixels each of which includes a photoelectric conversion element and an amplification element, sequentially accumulates charges subjected to photoelectric conversion by the photoelectric conversion element for a predetermined period, and outputs a voltage according to an accumulated charge amount after accumulation is competed as a pixel signal through the amplification element, and detects a light amount of the light pulse on the basis of pixel signals output from the plurality of pixels; and a control unit which controls an accumulation timing of the charges of the plurality of pixels in the photodetection unit in synchronization with incidence of the light pulse.

REFERENCE SIGNS LIST

11 Flow cytometer
31 Flow cell
32 Laser beam source
33 Photo diode
34 Imaging element (photodetector)
35, 36 Condenser lens
51 Sample tube
52 Sample flow
53 Specimen
71 Laser beam
72 Irradiation spot
73 Forward scattered light
74 Fluorescence
91 Pixel array
92 Connection unit
93 Detection circuit
94 Drive circuit
95 Logic circuit
96 Output circuit
101, 101a, 101b Pixel (pixel circuit)
111 Photo diode
112 Accumulation node
113 Transfer transistor
114 Amplification transistor
115, 115a, 115b Selection transistor
116 Reset transistor
117 Detection node
118 Power supply
121 Row drive circuit
122 Constant current circuit
123 Detection circuit
124 Vertical signal line
141 Pixel array
142 Detection circuit
143 Drive circuit
144 Output circuit
145 Logic circuit
151, 151a, 151b Pixel
181, 181-1, 181-2 Half mirror
182, 182-1, 182-2 Condenser lens
221 Pixel array
222 Connection unit
223 Detection circuit
224 Drive circuit
225 Logic circuit
226 Output circuit
227 Detection circuit
300 Radiation detection device
301 Light reception unit
302 Data processing unit
303 Signal line
311 Radiation
312 Photon
321 Partition wall
322 Photodetector
341 Scintillator
351 Pixel array
352 Photodetection circuit
361 Pixel (pixel signal)

The invention claimed is:

1. An optical measuring instrument, comprising:
a light source configured to generate a light pulse, wherein a first light pulse and a second light pulse are generated based on a irradiation of the light pulse on an object to be measured;
a photodiode configured to:
receive the first light pulse having a first intensity; and
generate an event signal based on a comparison of the first intensity and a threshold value;

a photodetector configured to:
receive the second light pulse by a plurality of pixels, wherein
the second light pulse has a second intensity lower than the first intensity, and
each pixel of the plurality of pixels includes a photoelectric conversion element and an amplification element;
accumulate a plurality of charges subjected to photoelectric conversion by the photoelectric conversion element, wherein the plurality of charges is accumulated for a specific period;
output a voltage as a pixel signal for each pixel of the plurality of pixels through the amplification element based on an amount of the plurality of charges accumulated for the specific period; and
detect a light amount of the second light pulse based on a plurality of pixel signals output from the plurality of pixels, wherein the plurality of pixel signals includes the pixel signal; and
circuitry configured to control the photodetector to allow the plurality of pixels to simultaneously complete the accumulation of the plurality of charges, wherein the accumulation of the charges is completed based on the generation of the event signal.

2. The optical measuring instrument according to claim 1, wherein
the plurality of pixels is divided into a plurality of pixel groups, and
the circuitry is further configured to control the photodetector to:
allow each pixel group of the plurality of pixel groups to simultaneously complete the accumulation of the plurality of charges based on the generation of the event signal;
allow each pixel group of the plurality of pixel groups to output the plurality of pixel signals; and
detect the light amount of the second light pulse based on the plurality of pixel signals.

3. The optical measuring instrument according to claim 2, wherein the circuitry is further configured to control the photodetector to:
allow one of a first pixel group of the plurality of pixel groups or a second pixel group of the plurality of pixel groups to simultaneously complete the accumulation of the plurality of charges based on the generation of the event signal;
allow the one of the first pixel group or the second pixel group to output the plurality of pixel signals;
detect the light amount of the second light pulse based on the plurality of pixel signals; and
alternately change the one of the first pixel group or the second pixel group each time the second light pulse is incident.

4. The optical measuring instrument according to claim 2, wherein the circuitry is further configured to control the photodetector to allow a first pixel group of a plurality of pixel groups and a second pixel group of the plurality of pixel groups to simultaneously start new accumulation at a same time as a time of the completion of the accumulation of the plurality of charges.

5. The optical measuring instrument according to claim 1, wherein
the photodetector further includes a plurality of detection circuits, wherein each detection circuit of the plurality of detection circuits is configured to read out pixel signals of a determined number of pixels to convert into digital signals, and
the photodetector is further configured to:
control the plurality of detection circuits to read out pixel signals of a part of the determined number of pixels to convert into the digital signals; and
detect the light amount of the second light pulse based on the pixel signals of the part of the determined number of pixels.

6. The optical measuring instrument according to claim 5, wherein
the photodetector further includes a pixel array in which the plurality of pixels is arranged, and
the photodetector is further configured to:
control the plurality of detection circuits to read out pixel signals of a part of pixels in a specific range in the pixel array out of the determined number of pixels to convert into the digital signals; and
detect the light amount of the second light pulse based on the pixel signals of the part of pixels in the specific range in the pixel array.

7. The optical measuring instrument according to claim 6, further comprising:
a plurality of photodetectors;
a mirror configured to disperse the second light pulse to the plurality of photodetectors; and
a condenser lens configured to condense the dispersed second light pulse to the specific range in the pixel array of each of the plurality of photodetectors, wherein
the plurality of photodetectors is configured to detect the light amount of the second light pulse based on the pixel signals of the part of the pixels in the specific range in the pixel array,
the light amount of the second light pulse is detected in an allocated period, and
the allocated period is from a start of an incidence of the second light pulse to a completion of an incidence of the second light pulse.

8. The optical measuring instrument according to claim 5, wherein each detection circuit of the plurality of detection circuits is connected to the plurality of pixels in an on-chip manner.

9. The optical measuring instrument according to claim 1, wherein
each pixel of the plurality of pixels includes a plurality of detection nodes in which the plurality of charges subjected to the photoelectric conversion by the photoelectric conversion element are sequentially accumulated for the specific period and the accumulated plurality of charges are transferred for one photoelectric conversion element after the accumulation is completed, and the circuitry is further configured to control the photodetector to:
allow the plurality of pixels to simultaneously complete the accumulation of the plurality of charges based on the generation of the event signal;
transfer the accumulated plurality of charges to one of the plurality of detection nodes;
output the plurality of pixel signals of the plurality of pixels based on the accumulated plurality of charges transferred to one of the plurality of detection nodes;
detect the light amount of the second light pulse based on the plurality of pixel signals; and
periodically switch a detection node among the plurality of detection nodes to which the accumulated plurality of charges is transferred, wherein the detection node is switched each time the second light pulse is incident.

10. The optical measuring instrument according to claim 1, wherein
the second light pulse is one of fluorescence or scattered light,
the light pulse is generated based on a supply of a laser beam to a specimen in a fluid which passes through a flow cell, and
the object corresponds to the specimen.

11. The optical measuring instrument according to claim 10, wherein
the photodetector is further configured to detect one of the fluorescence or the scattered light, and
the detected fluorescence or the scattered light is in a direction substantially perpendicular to a travel direction of the laser beam.

12. The optical measuring instrument according to claim 11,
wherein
the fluid passes through the flow cell in a direction substantially in front of a direction of the laser beam.

13. The optical measuring instrument according to claim 1,
wherein each of the first light pulse and the second light pulse is scintillation light based on incidence of a radiation on a scintillator.

14. A flow cytometer, comprising:
a light source configured to generate a light pulse, wherein a first light pulse and a second light pulse are generated based on irradiation of the light pulse on an object to be measured;
a photodiode configured to:
receive the first light pulse having a first intensity; and
generate an event signal based on a comparison of the first intensity and a threshold value;
a photodetector configured to:
receive the second light pulse by a plurality of pixels, wherein
the second light pulse has a second intensity lower than the first intensity, and
each pixel of the plurality of pixels includes a photoelectric conversion element and an amplification element;
accumulate a plurality of charges subjected to photoelectric conversion by the photoelectric conversion element, wherein the plurality of charges is accumulated for a specific period;
output a voltage as a pixel signal for each pixel of the plurality of pixels through the amplification element based on an amount of the plurality of charges accumulated for the specific period; and
detect a light amount of the second light pulse based on a plurality of pixel signals output from the plurality of pixels, wherein the plurality of pixel signals includes the pixel signal; and
circuitry configured to control the photodetector to allow the plurality of pixels to simultaneously complete the accumulation of the plurality of charges, wherein the accumulation of the charges is completed based on the generation of the event signal.

15. A radiation counter, comprising:
a light source configured to generate a light pulse, wherein a first light pulse and a second light pulse are generated based on a ctatc of irradiation of the light pulse on an object to be measured;
a photodiode configured to:
receive the first light pulse having a first intensity; and
generate an event signal based on a comparison of the first intensity and a threshold value;
a photodetector configured to:
receive the second light pulse by a plurality of pixels, wherein
the second light pulse has a second intensity lower than the first intensity, and
each pixel of the plurality of pixels includes a photoelectric conversion element and an amplification element;
accumulate a plurality of charges subjected to photoelectric conversion by the photoelectric conversion element, wherein the plurality of charges is accumulated for a specific period;
output a voltage as a pixel signal for each pixel of the plurality of pixels through the amplification element based on an amount of the plurality of charges accumulated for the specific period; and
detect a light amount of the second light pulse based on a plurality of pixel signals output from the plurality of pixels, wherein the plurality of pixel signals includes the pixel signal; and
circuitry configured to control the photodetector to allow the plurality of pixels to simultaneously complete the accumulation of the plurality of charges, wherein the accumulation of the charges is completed based on the generation of the event signal.

* * * * *